(12) United States Patent
Carmichael et al.

(10) Patent No.: US 10,118,772 B2
(45) Date of Patent: Nov. 6, 2018

(54) MACHINE AND METHOD FOR CARRYING OUT ONE OPERATION ON ARTICLES

(71) Applicant: Sidel S.p.A. CON SOCIO UNICO, Parma (IT)

(72) Inventors: James Carmichael, Parma (IT); Marco Ferri, Parma (IT); Nicola Veneziani, Parma (IT)

(73) Assignee: SIDEL S.P.A. CON SOCIO UNICO, Pharma (IT)

( * ) Notice: Subject to any disclaimer, the term of this patent is extended or adjusted under 35 U.S.C. 154(b) by 370 days.

(21) Appl. No.: 14/660,021

(22) Filed: Mar. 17, 2015

(65) Prior Publication Data
US 2015/0274438 A1    Oct. 1, 2015

(30) Foreign Application Priority Data

Mar. 31, 2014  (EP) .................................... 14162624

(51) Int. Cl.
*B65C 3/08* (2006.01)
*B65C 9/08* (2006.01)
(Continued)

(52) U.S. Cl.
CPC .......... *B65G 47/28* (2013.01); *B29C 49/4205* (2013.01); *B65C 9/0062* (2013.01); *B65C 9/02* (2013.01); *B65C 9/40* (2013.01); *B65G 29/00* (2013.01); *B65G 43/08* (2013.01); *B29K 2105/258* (2013.01); *B65C 3/06* (2013.01); *B65C 3/08* (2013.01); *B65C 3/14* (2013.01); *B65C 3/16* (2013.01); *B65C 3/163* (2013.01); *B65C 3/26* (2013.01); *B65C 9/188* (2013.01); *B65C 9/1815* (2013.01); *B65C 9/1819* (2013.01); *B65C 9/1826* (2013.01); (Continued)

(58) Field of Classification Search
CPC ......... Y10T 156/1768; Y10T 156/1771; Y10T 156/1773; B65C 3/06; B65C 3/08; B65C 3/14; B65C 3/16; B65C 3/163; B65C 3/26; B65C 9/00; B65C 9/1819; B65C 9/1815; B65C 9/18526; B65C 9/1876; B65C 9/18; B65C 9/1884
USPC ........................ 156/DIG. 8, DIG. 9, DIG. 13
See application file for complete search history.

(56) References Cited

U.S. PATENT DOCUMENTS 3,557,933 A * 1/1971 Sopher .................... B65C 9/065
                                                    198/394
4,758,300 A * 7/1988 King ........................ B65C 3/16
                                                    118/231
(Continued)

*Primary Examiner* — Carson Gross
(74) *Attorney, Agent, or Firm* — Finnegan, Henderson, Farabow, Garrett & Dunner, LLP

(57) ABSTRACT

A machine for carrying out at least one operation onto a first article and a second article is disclosed. The machine comprises feeding means for advancing a succession of the first article and the second article along a path and with a first speed; a first operative group, which comprises a first tool configured for carrying out operation onto the first article and which can be operated with a second speed associated to the first speed; gap creating means selectively controllable to create a first gap, which is arranged inside succession and is bounded between the first article and the second article; and a second operative group, which comprises a second tool configured for carrying out operation onto the second article and which can be operated at the second speed.

13 Claims, 21 Drawing Sheets

(51) Int. Cl.
*B65G 47/28* (2006.01)
*B29C 49/42* (2006.01)
*B65C 9/02* (2006.01)
*B65G 29/00* (2006.01)
*B65G 43/08* (2006.01)
*B65C 9/00* (2006.01)
*B65C 9/40* (2006.01)
B65C 3/14 (2006.01)
B65C 3/06 (2006.01)
B65C 3/16 (2006.01)
B65C 3/26 (2006.01)
B65C 9/18 (2006.01)
B29K 105/00 (2006.01)

(52) U.S. Cl.
CPC .......... *B65C 9/1876* (2013.01); *B65C 9/1884* (2013.01); *B65C 2009/407* (2013.01); *Y10T 156/10* (2015.01); *Y10T 156/1744* (2015.01); *Y10T 156/1771* (2015.01)

(56) References Cited

U.S. PATENT DOCUMENTS

| | | | |
|---|---|---|---|
| 6,428,639 B1 * | 8/2002 | Oldenburg | B65C 3/08 156/351 |
| 2002/0096260 A1 * | 7/2002 | Yang | B65C 3/14 156/351 |

* cited by examiner

MACHINE AND METHOD FOR CARRYING OUT ONE OPERATION ON ARTICLES

CROSS-REFERENCE TO RELATED APPLICATIONS

This application claims the benefit of priority of European Patent Application No. 14162624.2, filed Mar. 31, 2014, which is incorporated herein by reference.

The present invention relates to a method and to a machine for carrying out one operation on articles.

In particular, the present invention relates to a method and to a labelling machine for applying a plurality of labels on respective articles, especially containers filled with a pourable food product.

Plants for producing filled and labelled articles starting from respective pre-forms are known.

These plants substantially comprise:
a blowing machine for blowing the pre-forms and forming respective articles;
a filling machine for filling articles with the pourable product;
a labelling machine for applying labels on respective articles; and
a capping machine for applying a plurality of caps onto respective articles.

Alternatively, the labelling machine could be interposed between the blowing machine and the filling machine.

Each of those machines comprises, in turn:
a conveyor for conveying the pre-forms or the article along an operative path; and
one or more operative groups for carrying out the operations on the pre-forms or the articles travelling along the path.

The conveyors of the machines are operatively connected to one another, so as to form a conveying line which advances a flow of pre-forms or articles.

There is, on one hand, a tendency in the art to block conveyors one to another in the conveying line, in such a way that the rate of one of those conveyors determines the rates of the other of those conveyors.

In other words, there is a tendency to reduce as far as possible the use of buffers for pre-forms or articles along the conveying line. In this way, there is substantially limited room for accelerating one conveyor while decelerating another conveyor of the conveying line.

On the other hand, operative groups are known which, during the starting up or the shutting down steps, require to be accelerated from a slow speed to a high speed corresponding to the rate of the conveying line or decelerates from the high speed to the slow speed.

As a result, a need is felt within the art to properly match the variable speed of those operative groups with the constant speed flow of articles or pre-forms.

This is need is further exacerbated, by the fact that there is a tendency in the art to advance the conveying line at progressively increasing speeds. As a result, the operative groups are required to accelerate at progressively increasing speed in progressively shorter times.

The above-identified need is still further exacerbated by the fact that, under some circumstances, it is necessary to interrupt the operation of the operative groups.

In particular, it is necessary to interrupt the operation of the operative groups, in case the operative group is not properly carrying out the operation on the respective article.

In the known plant solutions, the interruption of the operation of the operative groups inevitably results in the interruption of the operation of the whole plant, with a consequent stop in the production of articles.

Furthermore, on the one hand, the operative groups generally do not tolerate a non-continuous flow of pre-forms or article, i.e. they do not tolerate gaps in the flow. This is due to the fact that the operative groups generally apply an element on the pre-forms/articles, or fill the articles with a product. Accordingly, in case of gaps in the flow of pre-forms or articles, there is a waste of element or product.

On the other hand, it not uncommon in the art that some articles or pre-forms are missing from the conveying line, thus forming gaps in the flow.

As a result, a need is felt within the industry to match operative groups which do not tolerate gaps with conveying lines which convey flow of articles or pre-forms with gaps.

The above-identified needs are particularly felt within the sector, in case of labelling machines, especially of labelling machine known as "roll-fed" labelling machine.

As a matter of fact, in this case, the conveyor is a rotary conveyor, which is part of the conveying line. The conveyor is fed with first articles and second articles to be labelled at an input station, conveys that first articles and second articles along an arch-shaped path, and outputs the labelled first articles and the labelled second articles to an output station.

The operative groups are:
a first labelling group, which feeds and applies a plurality of labels onto respective first articles: and
a second labelling group, which feeds and applies a plurality of labels onto respective second articles.

In the labelling machine known as "roll-feed", the first labelling and the second labelling group substantially comprise, each:
a shaft for rotatably supporting a reel off which a strip of labels is unwound and fed along a feed path;
a plurality of unwinding rollers for guiding the strip along a rectilinear feed path;
a cutter for cutting a sequence of single labels from the strip;
a transfer drum for advancing each label which has been previously cut; and
a gluing drum for applying glue onto each previously cut label.

In particular, the transfer drum is rotatable about an axis, comprises an outer surface which receives a succession of cut labels and covered with glue, and releases those labels at an application station after rotation about its own axis of a certain angle.

In particular, the transfer drum conveys the labels tangentially to the outer surface of the first articles and the second articles to be labelled, at the application station.

The first labelling group and the second labelling group simultaneously apply labels onto respective first articles and second articles, in order to increase the output rate of the labelling machine.

In particular, the carousel advances a succession of first articles and second articles alternate to each other, while the first labelling group applies labels onto the first articles and simultaneously the second labelling group applies labels onto the second articles.

Especially during starting up or shutting down steps, the speed of the transfer drum accelerates from a slow speed to a high speed corresponding to the rate of the other machines or decelerates from the high speed to the slow speed.

On the top of this, the known labelling machines cannot tolerate a non continuous flow of articles to be labelled. This is because the transfer drum of the labelling groups transfers the labels at the application station. Accordingly, in case no article is travelling at the application station, the transferred labels is wasted.

As a result, the matching of operative stations, as the labelling machines, with the flow of articles is problematic.

Furthermore, in the case of labelling machines, the operation must be interrupted in case the first labelling group or the second labelling group is not properly applying the labels onto first articles or second articles respectively.

This could occur, for example, in case the reel of one of the first labelling group or the second labelling group is terminating and, therefore, a new reel needs to be joined to the existing one.

It is an object of the present invention to provide a method for carrying out an operation onto respective articles, which meets at least one of these needs, in a straightforward, low-cost manner.

According to the present invention, there is provided a machine for carrying out an operation onto respective articles, as claimed in claim 1.

The present invention also relates to a method for carrying out an operation onto respective articles, as claimed in claim 10.

In the following a preferred, non-limiting embodiment of the present invention will be described by way of example with reference to the accompanying drawings, in which.

Figure 1:
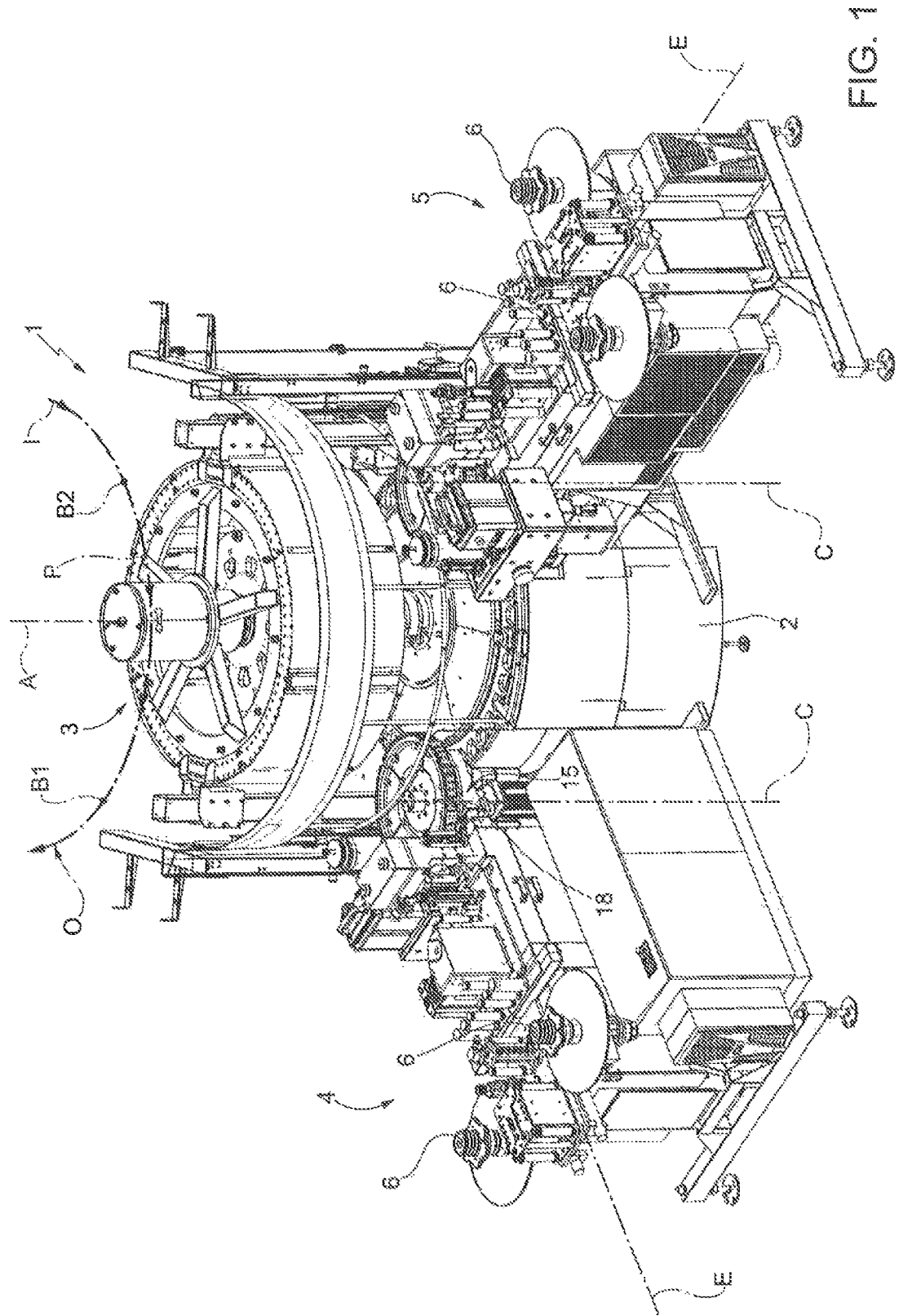
FIG. 1 is a perspective view of a machine for carrying out an operation on articles, a labelling machine with two labelling groups in the embodiment shown.

Number 1 in FIG. 1 indicates as a whole a machine for carrying out operations on articles 11, 11a, 11b.

In the embodiment shown, machine 1 is a labelling machine for applying labels 10a, 10b to respective articles 11, 11a, 11b (shown in FIGS. 12 to 21), containers for pourable food product in the embodiment shown.

In the following of the present description, machine 1 will be recalled as labelling machine 1.

In particular, labelling machine 1 is a so-called "roll-fed" labelling machine.

Labelling machine 1 substantially comprises (FIG. 1):
a stator 2;
a carousel 3, which rotates about an axis A, vertical in use, with respect to stator 2, and advances a succession of spaced articles 11, 11a, 11b along an arc-shaped path P;
a pair of labelling groups 4, 5, which are arranged on the periphery of carousel 3.

Labelling machine 1 is incorporated in a plant 100 for producing labelling articles 11, 11a, 11b.

Plant 100 is only partially shown in FIGS. 12 to 21 and substantially comprises:
a conveying line 160 for conveying a succession of pre-forms 108 and articles 11, 11a, 11b through plant 100;
a blowing machine (not-shown) for blowing the pre-forms 108 and forming respective articles 11, 11a, 11b;
a filling machine (not-shown) for filling articles 11, 11a, 11b with the pourable product;
labelling machine 1; and
a capping machine (not-shown) for applying a plurality of caps onto respective articles 11, 11a, 11b.

Alternatively, labelling machine 1 could be interposed between the blowing machine and the filling machine.

In particular, conveying line 160 is shown only with reference to a conveyor 101 for feeding a plurality of pre-forms 108 and carousel 3.

Conveying line 160 further comprises further conveyors (not-shown) interposed between conveyor 101 and carousel 3 as well further conveyor (not-shown) upstream of conveyor 101 and downstream of carousel 3, proceeding according to the advancing direction of pre-forms 3 and articles 11a, 11b, 11.

Preferably, conveyor 101, carousel 3 and the other conveyors are operatively connected to each other, so that their speed are directly dependent on one another.

In other words, conveying line 160 preferably does not contain any buffer of stationary pre-forms 108 or articles 11, 11a, 11b.

Furthermore, carousel 3 travels along path P substantially with a constant nominal speed V0. The expression "nominal speed" indicates that carousel 3 travels at speed V0, after the start-up step and before the slowing down step of labelling machine 1.

In addition, it is important to note that nominal speed of carousel 3 can oscillate up and down speed V0, within a slight range, e.g. 10%.

In the present description, the term "speed" indicates tangential speed of articles 11, 11a, 11b.

In greater detail, path P comprises:
an input station I, at which carousel 3 is fed with articles 11, 11a, 11b to be labelled; and
an output station O, at which carousel 3 outputs labelled articles 11, 11a, 11b.

Proceeding according to the advancing direction of articles 11, 11a, 11b from station I to station O, path P comprises:
an application station B2; and
an application station B1.

In the embodiment shown, path P is shaped as an arch of circumference having centre on axis A.

Labelling groups 4, 5 are arranged peripherally with respect to carousel 3.

Each labelling groups 4, 5 substantially comprises (FIGS. 2 and 12 to 21):

a pair of shafts 6 for rotatably supporting relative reels 7a, 7b (shown only in FIGS. 12 to 21) off which a strip 8 of labels 10a, 10b is unwound and fed along a feed path towards application station B1, B2;

a plurality of unwinding rollers 16 for guiding strip 8 along the feed path;

a cutting element 9 for cutting, one after the other, labels 10 from strip 8;

a glue roller 12 for applying glue onto cut labels 11; and a transfer element 13 for transferring cut and glue-covered labels 10a, 10b along an arc-shaped trajectory Q having centre on an axis C from an input station J either to application station B1, B2 or to a discarding station D.

Labelling group 4 can be selectively arranged in a first operative position (FIGS. 12 to 14), in which it applies, at application station B1, a succession of labels 10a onto respective articles 11a.

Advantageously, labelling machine 1 comprises a gap creating element 110 (FIGS. 12 to 21) for creating gap 82, which is arranged inside the succession of articles 11, 11a, 11b and is bounded between articles 11a and articles 11b.

Furthermore, labelling group 4 is selectively arrangeable in a first rest configuration (FIGS. 15 to 18 and 19 to 21), in which it is prevented from transferring labels 10a to articles 11a.

Labelling group 5 is selectively movable between:

a second operative configuration, in which it transfers labels 10b to respective articles 11b at application station B2 (FIGS. 15 to 17 and 21);

a second rest configuration, in which it is prevented from transferring labels 10b to respective articles 11b at application station B2 (FIGS. 12 to 14 and 19 and 20).

In particular, before gap 82 is created, one (4 in FIGS. 12 to 21) of labelling group 4, 5 acts as a "master" labelling group and is arranged in the first (or second) operative configuration while the other (5 in FIGS. 12 to 21) of labelling group 4, 5 acts a "slave" labelling group and is arranged in the second (first) rest configuration.

When gap 82 is created, labelling group 4 (5) previously acting as the "master" labelling group is moved to the first (second) rest configuration and becomes the "slave" labelling group, while labelling group 5 (4) acting as the "slave" labelling group moves to the second (first) operative configuration and becomes the "master" labelling group.

As it will be evident in the following of the present description, when labelling group 4 (5) is in the first (second) operative configuration, transfer element 13 transfers labels 10a (10b) to first (second) articles 11a (11b) at application station B1 (B2), and transfer element 13 is tangent to articles 11a (11b) travelling along path P at application station B1 (B2).

Conversely, when labelling group 4 (5) is in the first (second) rest configuration, transfer element 13 is prevented from transferring labels 10a (10b) to first (second) articles 11a (11b) at application station B1 (B2), and transfer element 13 is spaced from application station B1 (B2).

In greater detail, gap 82 is bounded by an adjacent downstream article 11a and an immediately adjacent upstream article 11b, proceeding according to the advancing direction of articles 11, 11a, 11b along path P.

Figure 13:
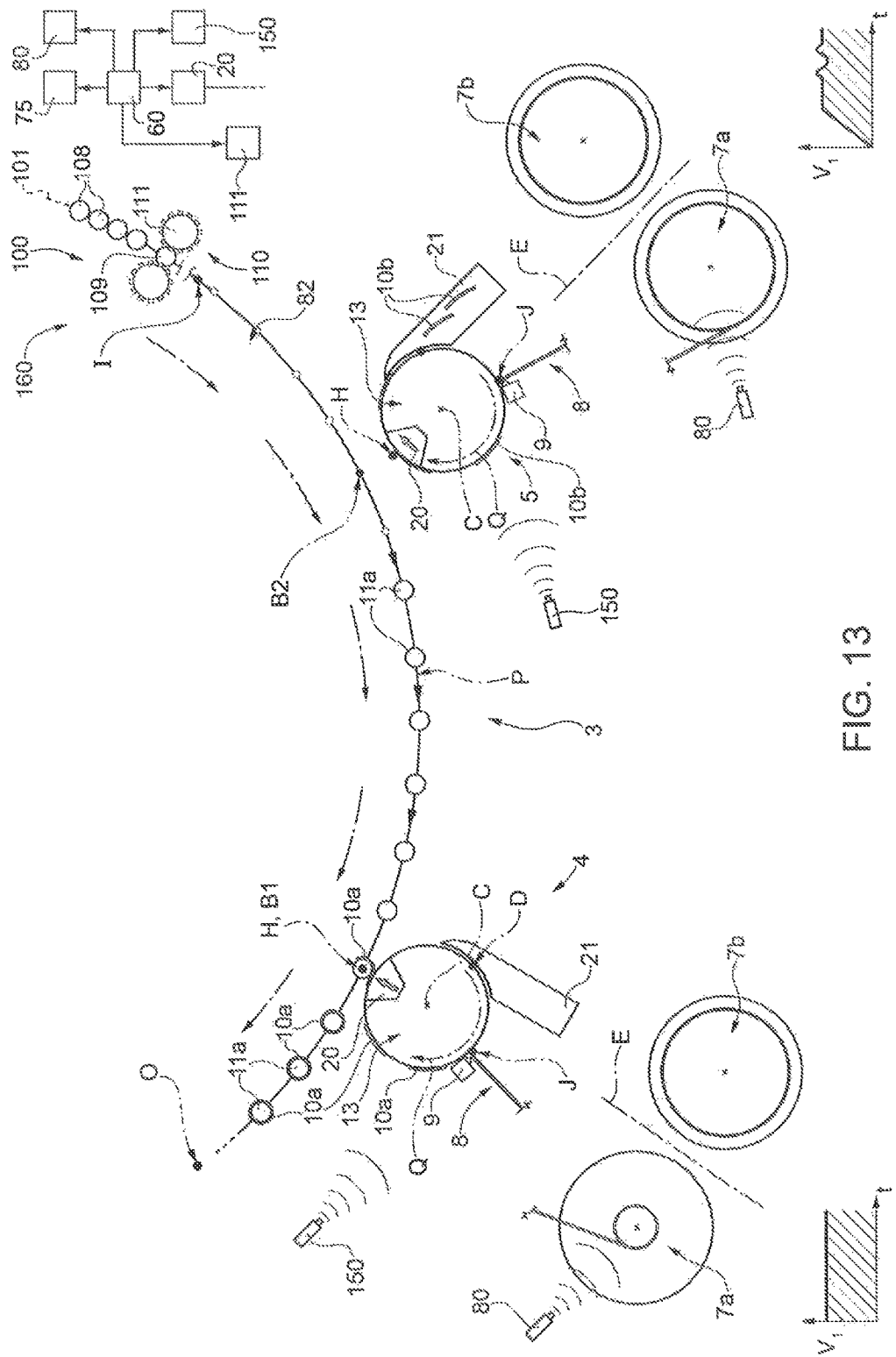
Figure 14:
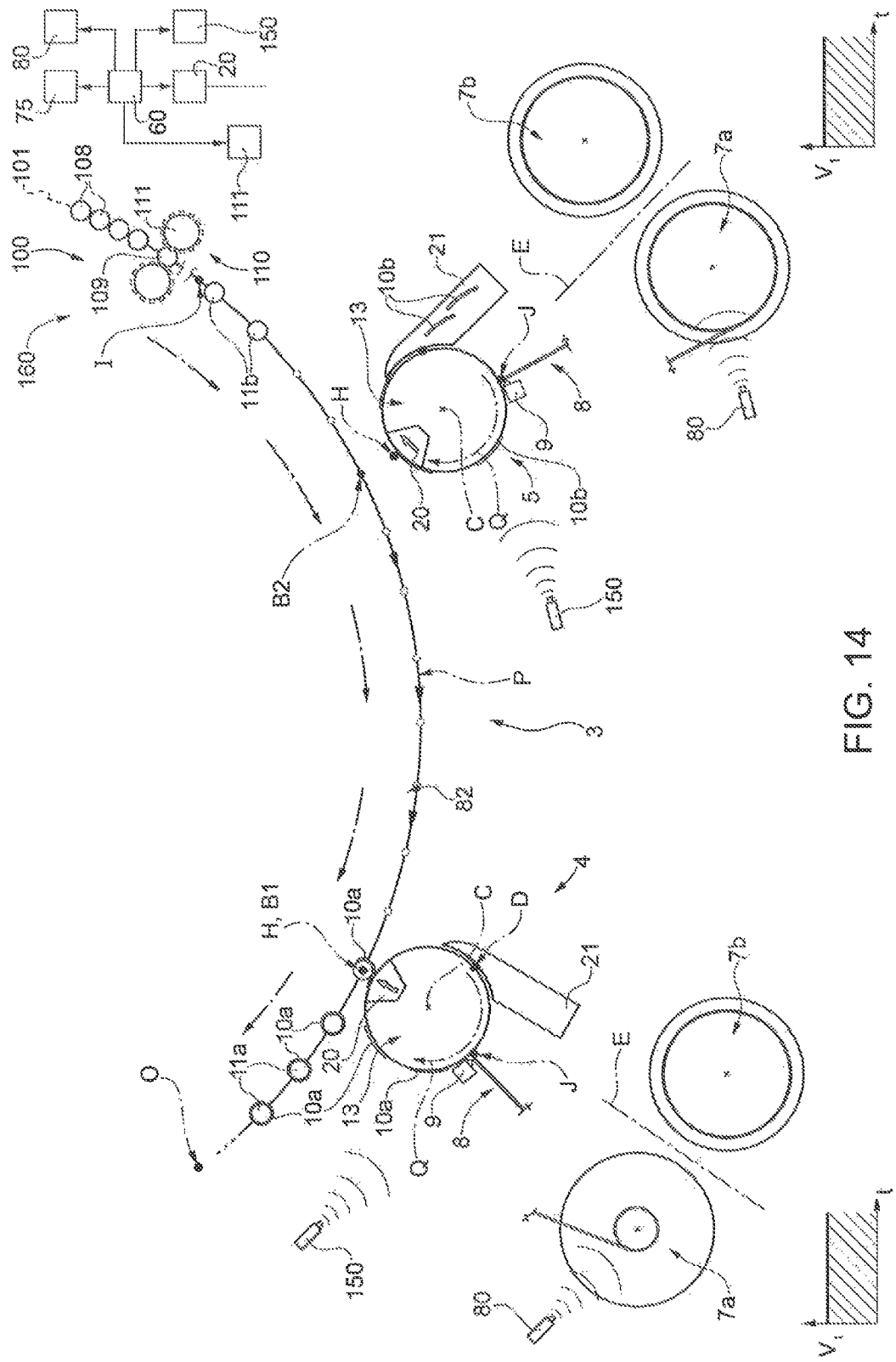

With reference to FIGS. 12 to 21, control unit 60 is programmed for moving labelling group 4 from the first operative configuration to the first rest configuration, after labelling group 4 has transferred labels 10a onto immediately adjacent downstream article 11a (FIG. 14).

Figure 15:
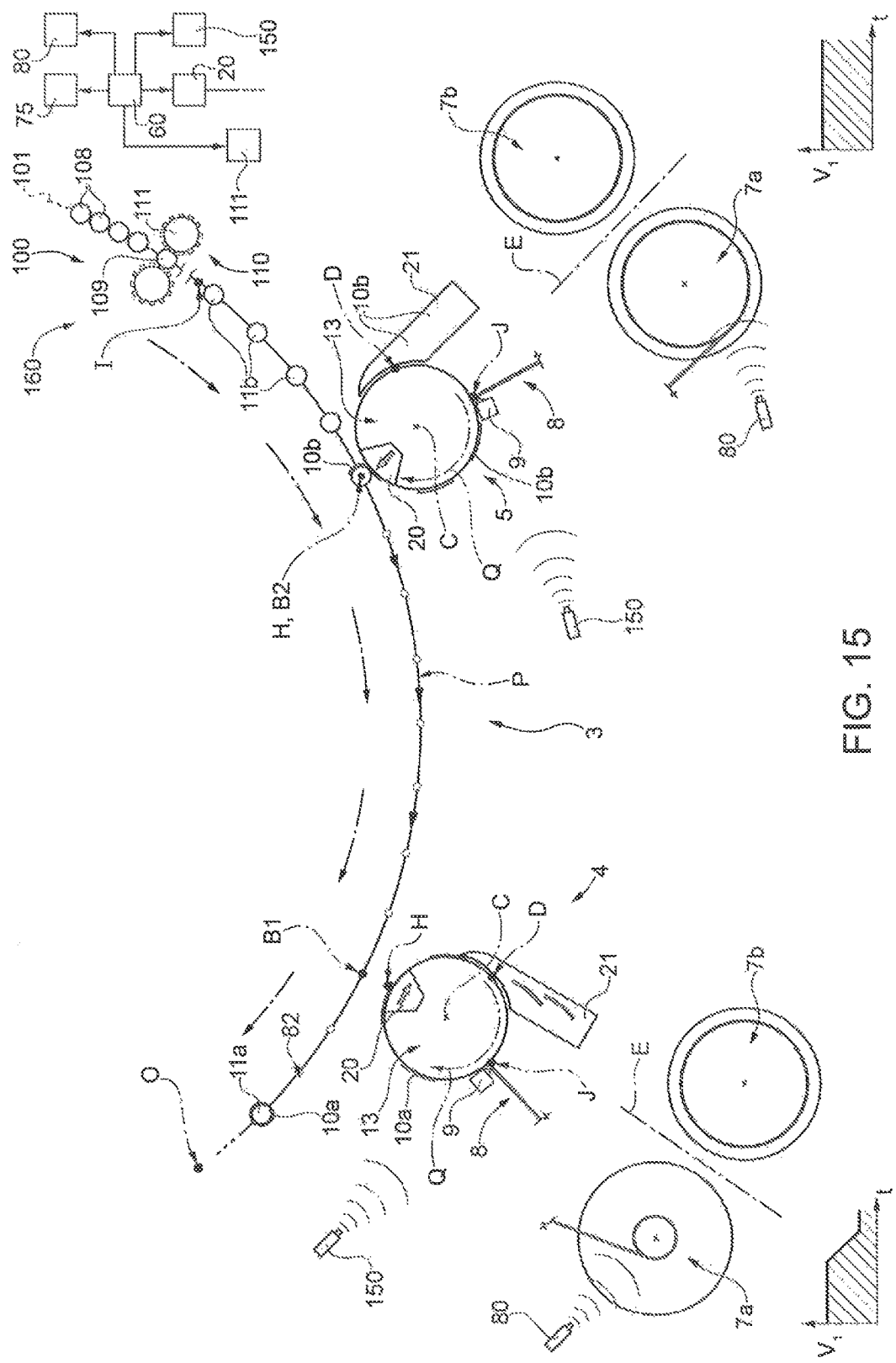

Furthermore, control unit 60 is programmed for moving labelling group 5 from the second rest configuration to the second operative configuration, before labelling group 5 transfers labels 10b onto immediately adjacent upstream article 11b (FIG. 15).

Figure 20:
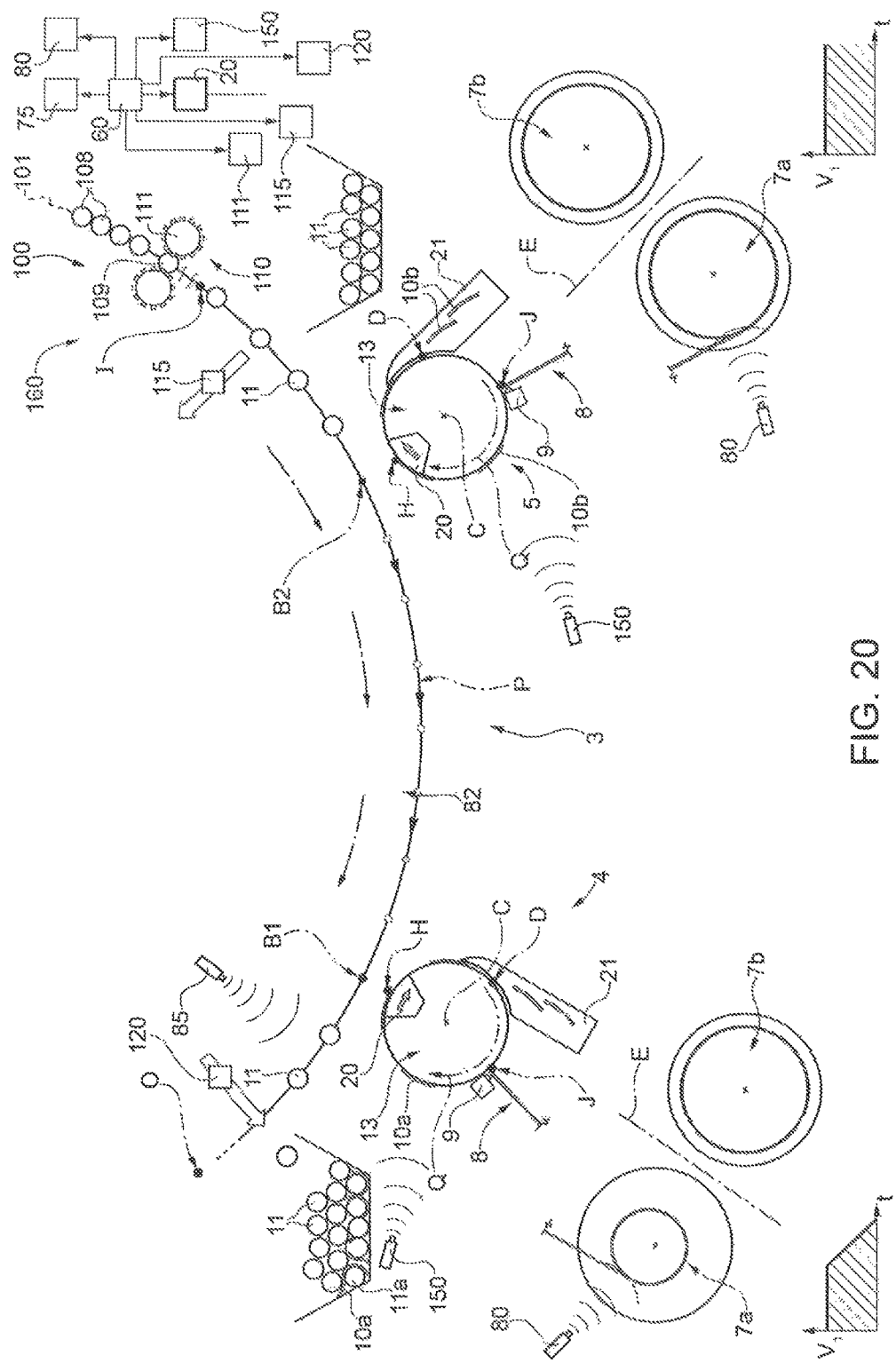

Control unit 60 is also programmed for moving first labelling group 4 from the first operative position to the first rest position and for moving labelling group 5 from the first rest position to the second operative position, when gap 82 travels along path P and between application stations B1, 82 (FIGS. 15 and 20).

In this way, none of articles 11a, 11b remain unlabelled.

Labelling machine 1 further comprises (FIGS. 12 to 18):

a sensor 80 (only schematically shown) for generating a signal associated to the fact reel 7a of labelling group 4 (or 5) is terminating; and a visual control system 150, a camera in the embodiment shown, which controls the correct positioning of labels 10a, 10b conveyed by transfer element 13.

Furthermore, gap creating element 110 comprises a switch 111 (only schematically shown) for interrupting the flow of pre-forms 108 along conveyor 101 and for creating, therefore, a gap 109 inside that flow.

In particular, switch 111 is operated to interrupt the flow of pre-forms 108 along conveyor 101, as a consequence of the signal generated by sensor 80.

Figure 11:
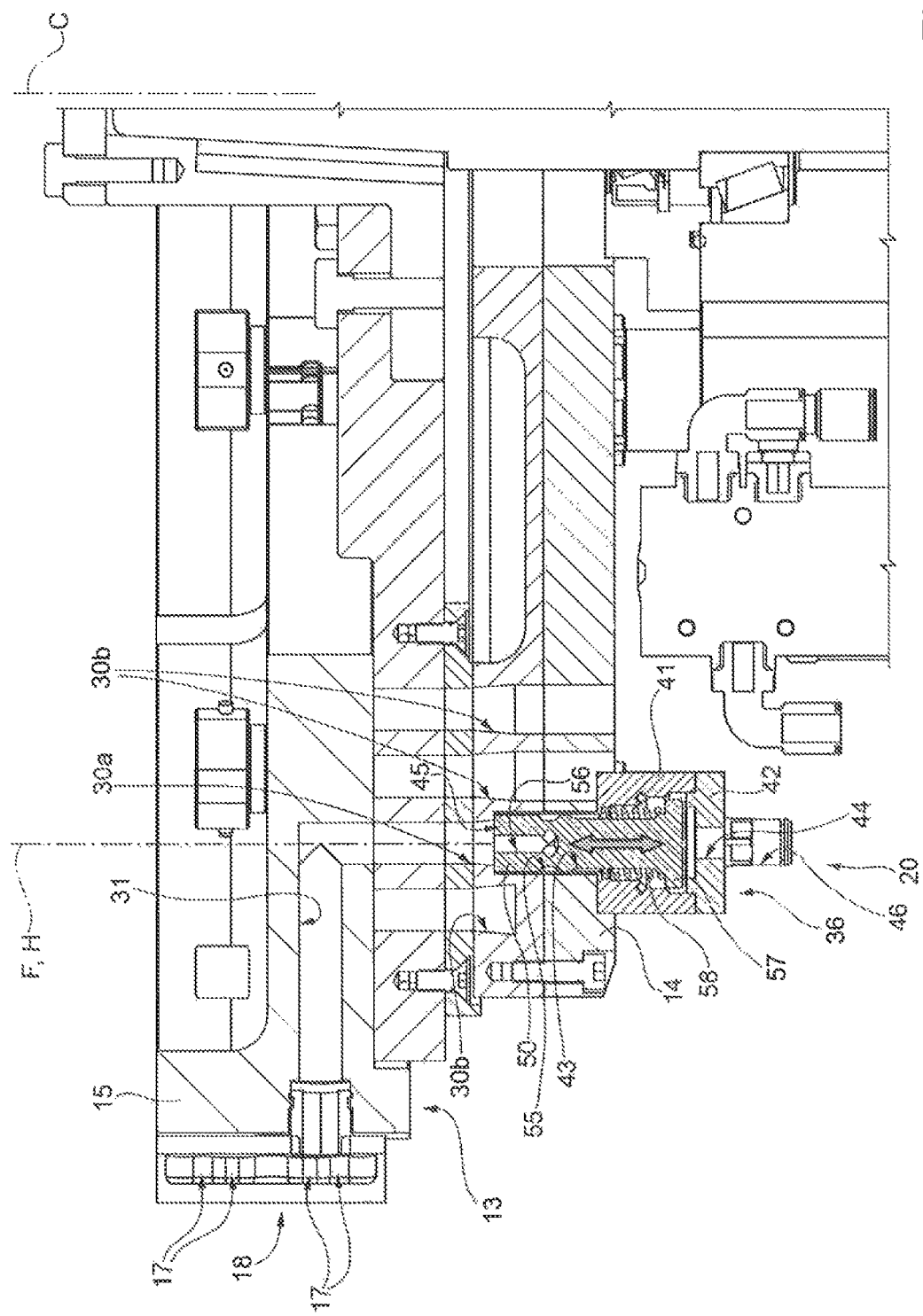
Figure 12:
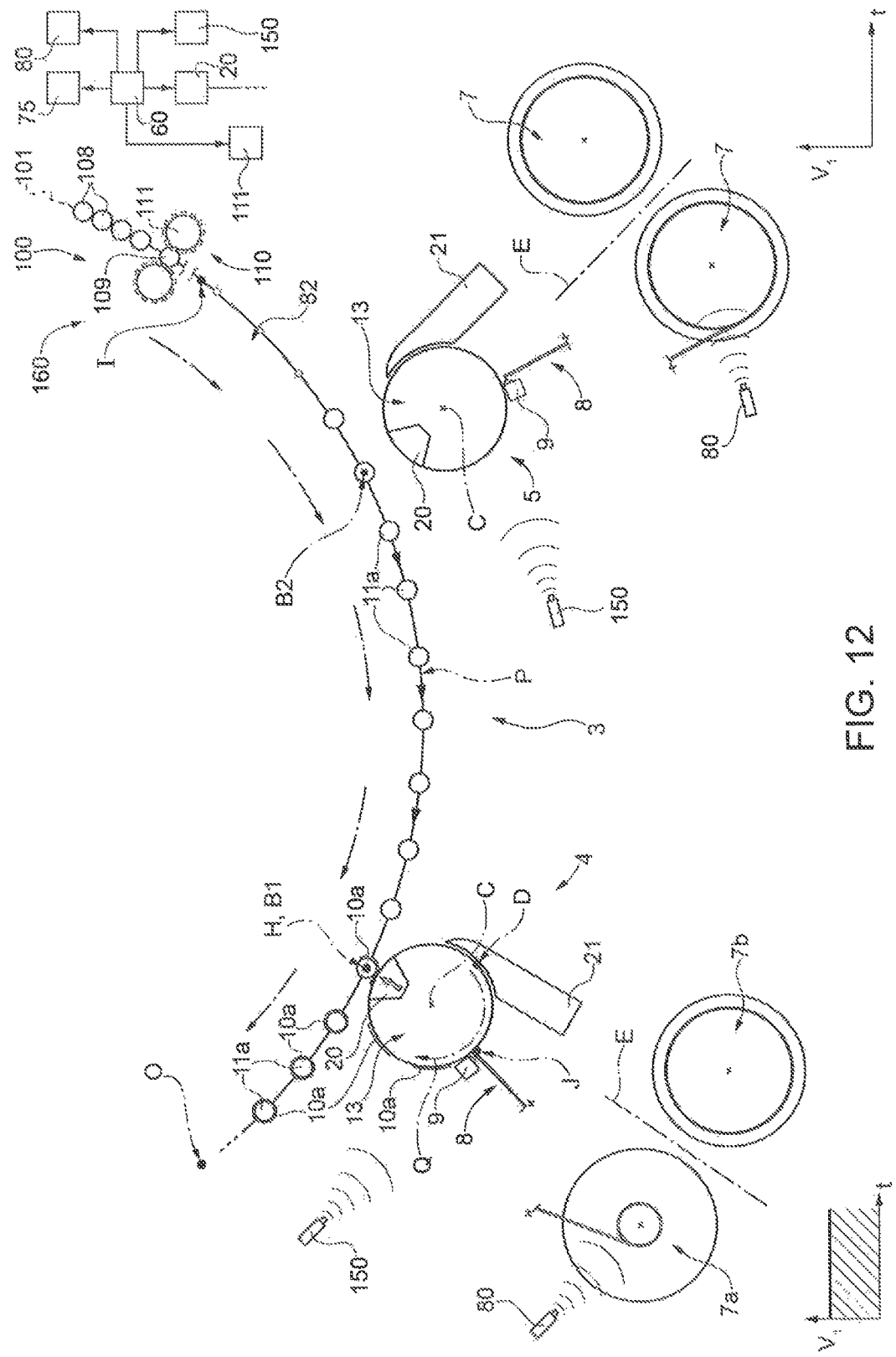
FIGS. 12 to 18 are schematic views of the labelling machine of FIG. 1 representing respective subsequent steps of a first operative scenario.

Starting from a situation in which labelling group 4 is in the first operative configuration and labelling group 5 is in the second rest configuration, control unit 60 is programmed, as a consequence of the signal generated by sensor 80 (as shown in FIG. 11), for:

moving labelling group 4 (5) from the first (second) operative configuration to the first (second) rest configuration; and moving labelling group 5 from the second (first) rest position to the second (first) operative configuration.

In particular, control unit 60 is programmed for:

moving transfer element 13 (and therefore strip 8) of labelling group 4 (5) at a substantially highest speed V1, when the latter is in the operative configuration;

decelerating transfer element 13 (and therefore strip 8) of labelling group 4 (5) from highest speed V1 to a speed V2 lower than speed V1 and then to a null speed, so as to allow the splicing of a new reel 7b to the existing reel 7a.

Highest speed V1 is associated to speed V0 of carousel 3. In the embodiment shown, speed V1 equals speed V0.

Control unit 60 is also programmed, after the joining of new reel 7b to reel 7a, and with the labelling group 4 (5) in the rest position, for:

moving transfer element 13 (and therefore strip 8) of labelling group 4 (5) at speed V2 lower than highest speed V1;

accelerating transfer element 13 (and therefore strip 8) of labelling group 4 (5) at a third speed V3 higher than speed V2 and lower than highest speed V1; and decelerating transfer element 13 (and therefore strip 8) of labelling group 4 (5) up to a null speed.

Furthermore, control unit 60 is programmed for accelerating transfer element 13 of labelling group 5 (4) from a null-speed to highest speed V1 according a linear ascending ramp (FIG. 13).

In particular, as shown in FIG. 13, drum 15 of labelling group 5 (4) reaches highest first rotational speed V1 before labelling group 5 (4) reaches the first (second operative) configuration.

Figure 19:
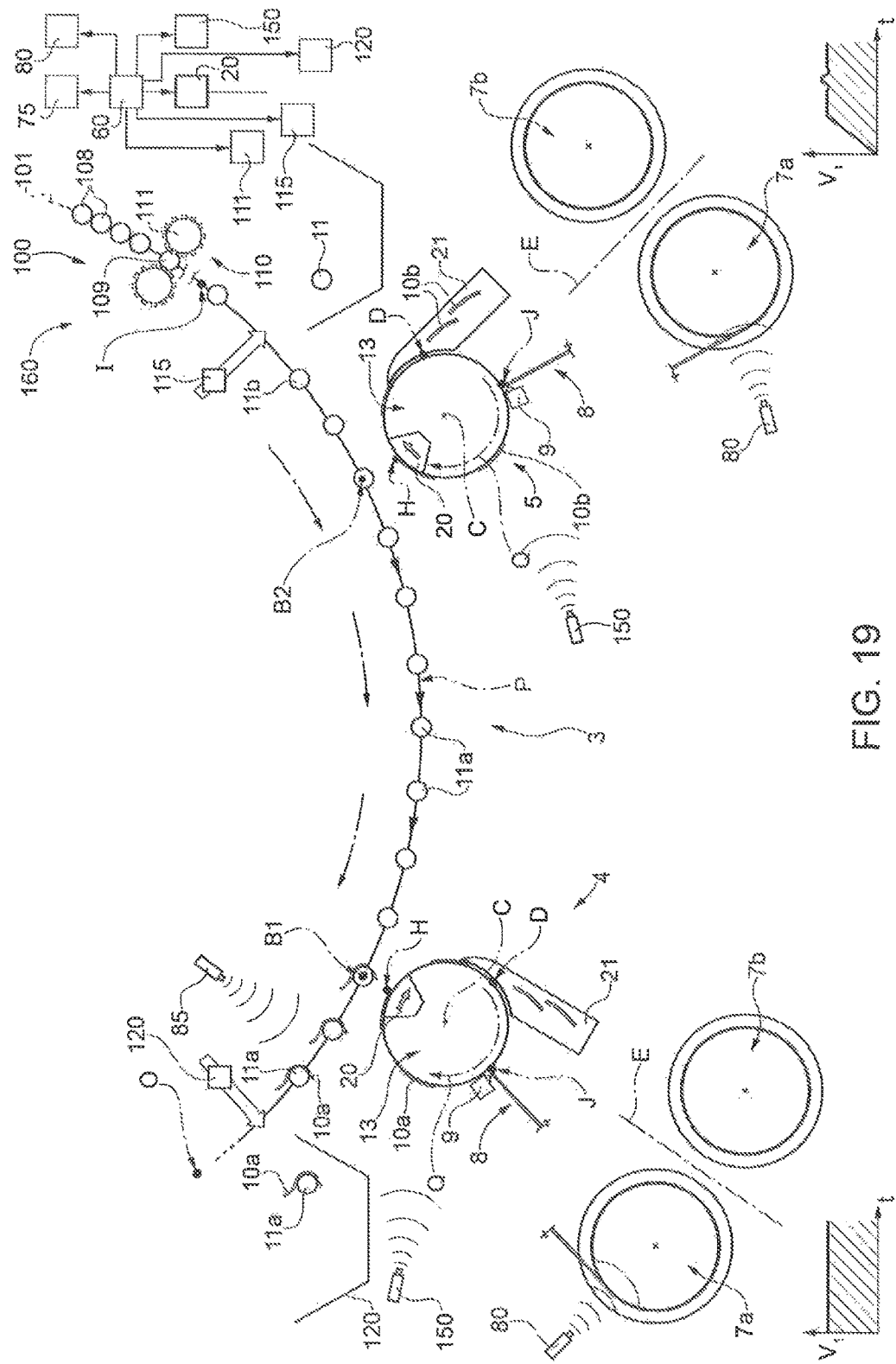
FIGS. 19 to 21 are schematic views of the labelling machine of FIG. 1 representing respective subsequent steps of a second operative scenario.
Figure 21:
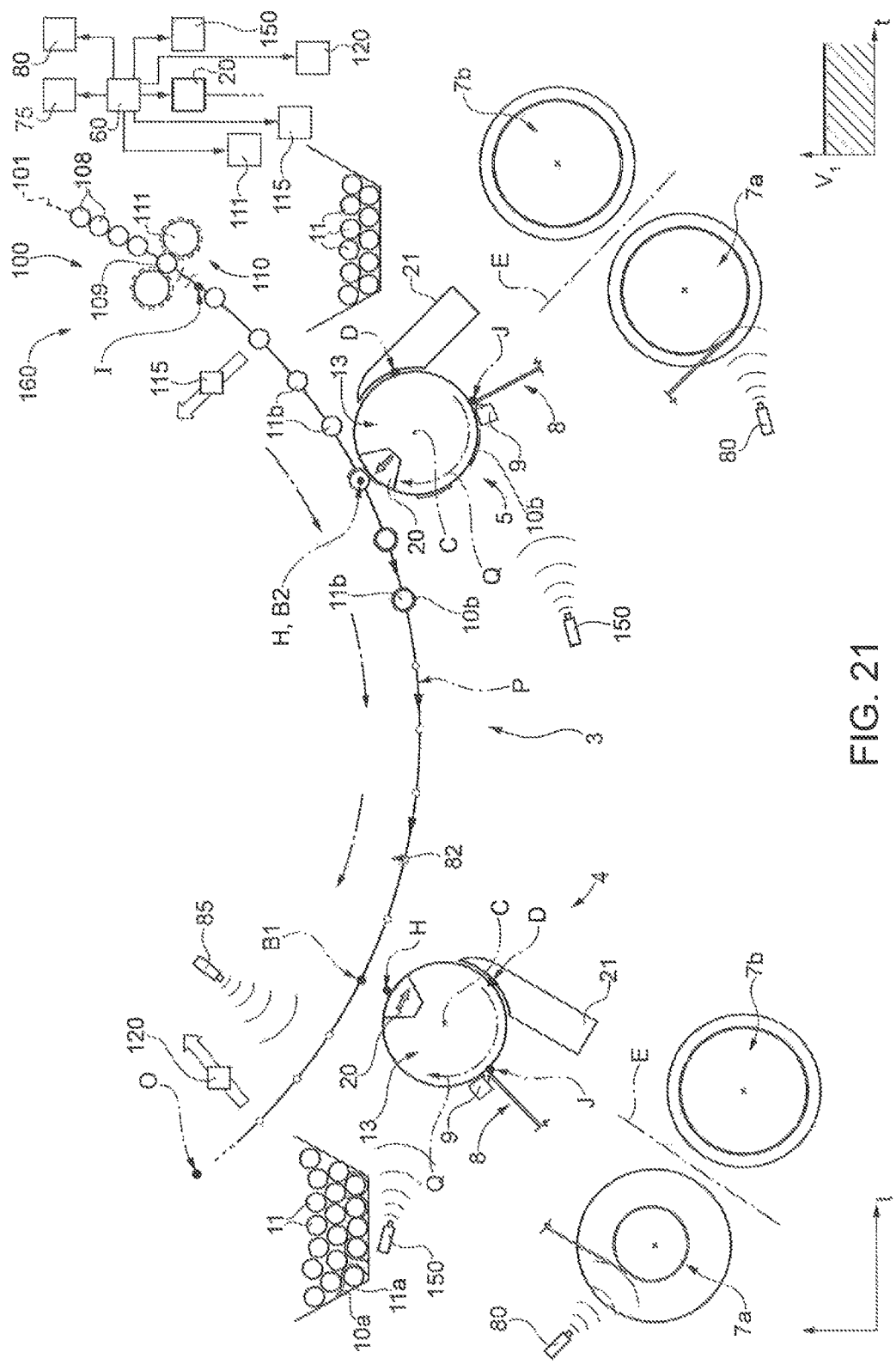

With reference to FIGS. 19 to 21, labelling machine 1 further comprises:

a sensor 85 for detecting that labelling group 4 (5) is not properly applying respective labels 10*a* (10*b*) onto respective articles 11*a* (11*b*) at application station B1 (B2);

an expelling device 115 (only schematically shown) selectively controllable for expelling not properly labelled articles 11*b* upstream of application station B1 and/or B2, proceeding according to the advancing direction of articles 11, 11*a*, 11*b* along path P; and an expelling device 120 (only schematically shown) for expelling not properly labelled articles 11*a*, 11*b* downstream of application stations B1 and/or B2.

In particular, expelling device 115 expels articles 11, as a consequence of the signal generated by sensor 85.

Expelling device 120 expels articles 11*a*, 11*b*, as a consequence of the signal generated by sensor 85.

Control unit 60 is programmed, as a consequence of the signal generated by sensor 85, for (FIG. 21):

moving labelling group 4 (5) from the first operative configuration to the first rest configuration; and moving labelling group 5 (4) from the second rest configuration to the second operative configuration.

Furthermore, control unit 60 is programmed, while transfer element 13 of labelling group 4 (5) moves from the first (second) operative configuration to the first (second) rest configuration, for:

decelerating transfer element 13 of labelling group 4 (5) form highest first speed V1 to a null speed, according to a linear descending ramp in the embodiment shown (FIG. 20);

accelerating transfer element 13 of labelling group 5 (4) from a null speed to highest first speed V1, according to a linear ascending ramp in the embodiment shown (FIG. 19).

Preferably, transfer element 13 (and therefore strip 8) of labelling group 4 (5) stops, before labelling group 4 (5) reaches the first (second) rest position.

In a completely analogous way, transfer element 13 (and therefore strip 8) of labelling group 5 (4) preferably reaches highest first speed V1, before labelling group 4 (5) reaches the second (first) operative position.

Figure 2:
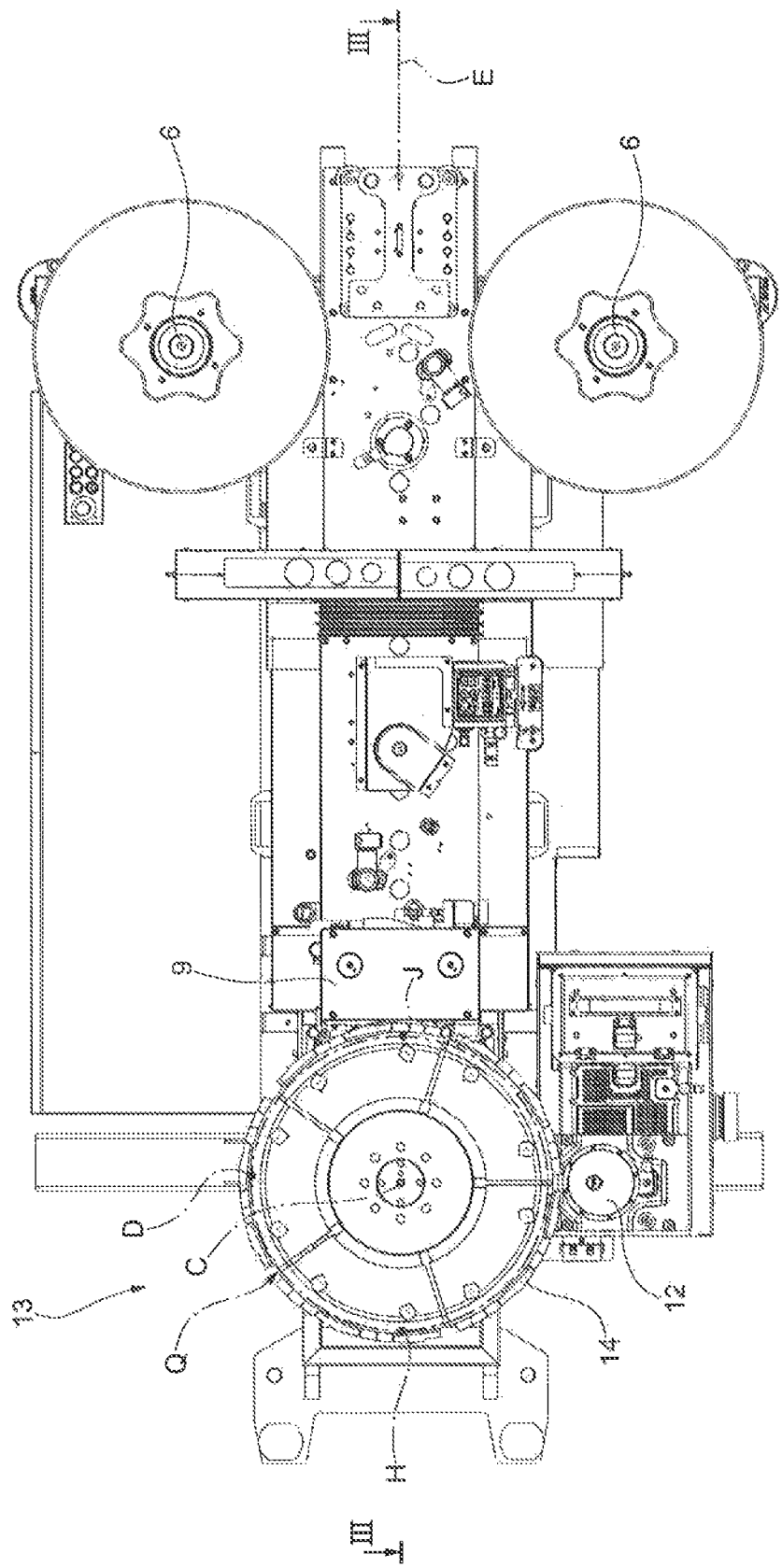
FIG. 2 is a top view of one of the labelling group of FIG. 1.

In particular, transfer system 13 transfers labels 10*a*, 10*b* to be applied on respective articles 11*a*, 11*b* from input station J to transfer station H, whereas it transfers labels 10*a*, 10*b* to be discarded from input station J to discarding station D (FIG. 2).

During application of labels 10*a*, 10*b* on relative articles 11*a*, 11*b* transfer element 13 of labelling group 4, 5 is arranged in an operative position, in which trajectory Q is tangent to articles 11*a*, 11, 11*b* travelling along path P at application station B1 (B2).

In greater detail, when transfer element 13 of labelling group 4, 5 is in the operative position, transfer station H is coincident with application station B1, B2.

Discarding station D is arranged downstream of transfer station H, proceeding according to the advancing rotation direction of drum 15.

Application station B1, B2 is arranged at a first angular distance from input station J and discarding station D is arranged at a second angular distance form station J. The second angular distance is greater than the first angular distance (FIG. 2).

Axis C is parallel and distinct from axis A.

With reference to FIGS. 1, 10, 11 and 12 to 21, transfer system 13 of each labelling group 4, 5 substantially comprises:

a stator 14;

a drum 15, which is supported on stator 14 in a rotatable manner about axis C;

a diverting device 20, which can be arranged in a first configuration (shown in FIGS. 12 to 21 by a substantially vertical arrow directed towards carousel 3) in which it allows drum 15 to transfer labels 10*a*, 10*b* to be applied onto respective articles 11*a*, 11, 11*b* from station J to transfer station H, or in a second configuration (shown in FIGS. 12 to 21 by a substantially horizontal arrow directed towards discarding station D) in which it allows drum 15 to transfer labels 10*a*, 10*b* to be discarded from station J to discarding station D; and a sucking device 21 (only schematically shown in FIGS. 12 to 21), which is arranged at discarding station D and which receives labels 10*a*, 10*b* to be discarded at discarding station D.

Visual control system 150 controls the correct positioning of labels 10*a*, 10*b* in sucking device 21 at discarding station D. Alternatively or in combination, visual control system 150 controls the positioning of labels 10*a*, 10*b* on drum 15, upstream of cutting element 9.

Figure 10:
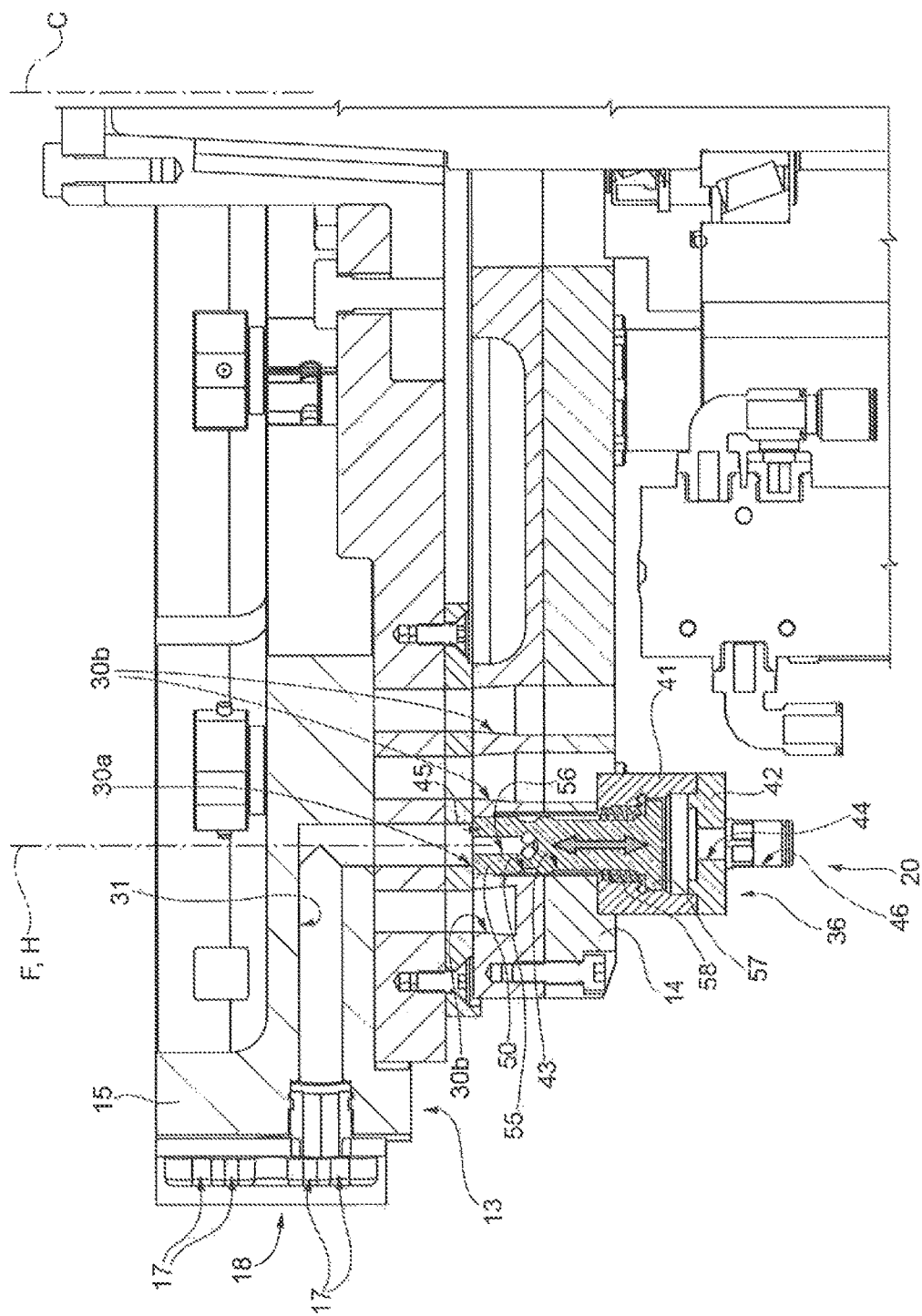
FIGS. 10 and 11 are enlarged sections of the labelling group of FIGS. 2 to 10, showing respectively the diverting device in a first configuration and in a second configuration.

Stator 14 comprises, in turn, a plurality of vacuum sources arranged in respective stationary channels 30*a*, 30*b* shaped as arch having centre on axis C (FIGS. 10 and 11).

Drum 15 is independently driven by a motor (not shown) about axis C.

Drum 15 comprises, in turn, a lateral outer surface 18 extending cylindrically about axis C.

Surface 18 comprises a plurality, five in the embodiment shown, of conveying sections adapted to convey respective labels 10*a*, 10*b* along the arch-shaped trajectory.

Each conveying section is circumferentially bounded by an upstream elastic pad and by a downstream elastic pad, which are angularly spaced from one another.

Drum 15 comprises (FIGS. 10 and 11):

a plurality of channels 31 (only one of which is shown in FIGS. 10 and 11), shaped as arches having common centre on axis C; and a plurality of air ports 17 defined by surface 18 and arranged both in conveying sections and in downstream pad and upstream pad.

Channels 30*a*, 30*b*; 31 extend at given distances from axis A and for given arches about axis C.

In particular, for some angular positions of drum 15, one of channels 31 is superimposed to at least one respective channel 30*a*, 30*b*.

In this way, air ports 17 are connected to the vacuum source and can exert a suction action on label 10*a*, 10*b*.

For some other angular positions of drum 15, channels 31 interact with different sections of channels 30*a*, 30*b*.

Accordingly, for these other angular positions of drum 15, air ports 17 are fluidly disconnected from the vacuum source and do not exert any suction action on label 10*a*, 10*b*.

In greater detail, at station J, air ports 17 of the upstream pad of each conveying section are fluidly connected with the vacuum source, so as to suck the trailing edge of respective label 10*a*, 10*b*.

As each conveying section rotates about axis C from station J to transfer station H, respective air ports 17 of that conveying station and of the downstream pad are connected with the vacuum source, so as to suck the remaining part of respective label 10*a*, 10*b*.

In this way, each label 10*a*, 10*b* is advanced from station J to transfer station H with its leading edge held on the upstream pad and its trailing edge held on the downstream pad.

In particular, when each label 10a, 10b reaches transfer station H, channels 30a, 31 are superimposed.

When diverting device 20 is arranged in the first configuration, the fluidic connection between air ports 17 travelling at transfer station H and the vacuum source is interrupted.

In this way, each label 10a, 10b is gradually released by drum 15 and transferred outside drum 15 at transfer station H.

As it will evident from the foregoing of the present description, when diverting device 20 is arranged in the first configuration, air ports 17 travelling at transfer station H eject an air jet on label 10a, 10b, so as to ease the release of labels 10a, 10b at transfer station H.

When diverting device 20 is arranged in the second configuration, the fluidic connection between air ports 17 travelling at transfer station H and the vacuum source is maintained.

Furthermore, when diverting device 20 is arranged in the second configuration, air ports 17 do not eject any air jet on labels 10a, 10b travelling at transfer station H.

In this way, labels 10a, 10b can reach discarding station D, whereat they are sucked by sucking device 21.

Diverting device 20 substantially comprises (FIGS. 8, 9 to 11):
- a plurality of electro-valves 35a, 35b, 35c; and
- an actuator 36, which is controlled by electro-valve 35a, 35b, 35c for selectively interrupting the fluidic connection between air ports 17 travelling at transfer station H and the vacuum source, and for selectively causing air ports 17 travelling at transfer station H to eject a jet of air onto label 10a, 10b so as to ease the release of label 10a, 10b at transfer station H.

In greater detail, actuator 36 is arranged on stator 14 at transfer station H and comprises, in turn:
- a housing 41 fitted to stator 14; and
- a shutter 45 (or locking piston) movable inside a seat 43 of housing 41 along an axis F parallel to axis C between a first position and a second position; and
- a flange 42 fitted to housing.

Seat 43 opens, on one side, in channel 30a and, on the other side, in a hole 44 of flange 42 which is connected to electro-valve 35a by a duct 46.

Shutter 45 comprises, in turn:
- a stem 50 elongated along axis F and arranged on the side of channel 30a; and
- a base 57 enlarged with respect to stem 50, orthogonal to axis F, and arranged on the side of flange 42.

Stem 50 comprises an annular groove 55 which extends about axis F.

Furthermore, stem 50 defines a duct 56 which is fluidly connected with groove 55 and is fluidly connected with channel 30a (FIGS. 8, 9, 10 and 11).

When shutter 45 is in the first position (raised in FIG. 10), stem 50 fully engages channel 30a, thus interrupting the fluidic connection between the vacuum source and channel 31 connected to air ports 17 travelling at transfer station H. In this way, no vacuum action is exerted on label 10 travelling at transfer station H.

Furthermore, when the shutter 45 is in the first position, base 57 is spaced along axis F from flange 42 and abuts against a shoulder defined by housing 41.

When the shutter 45 is in the second position, stem 50 leaves free part of channel 30a, thus maintaining the fluidic connection between the vacuum source and channel 31a connected to air ports 17 travelling at transfer station H. In this way, the vacuum action is exerted on labels 10a, 10b travelling at transfer station H.

Furthermore, when the shutter 45 is in the second position, base 57 contacts flange 42 and is spaced by shoulder.

Electro-valve 35a can be actuated for generating a flow of air in pressure inside duct 46, thus increasing the pressure in the volume between flange 42 and base 57 and causing shutter 45 to move from the second position to the first position parallel to axis F.

Base 57 is elastically connected to flange 42 by a spring 58, which causes the return of shutter 45 from the first position to the second position.

Figure 9:
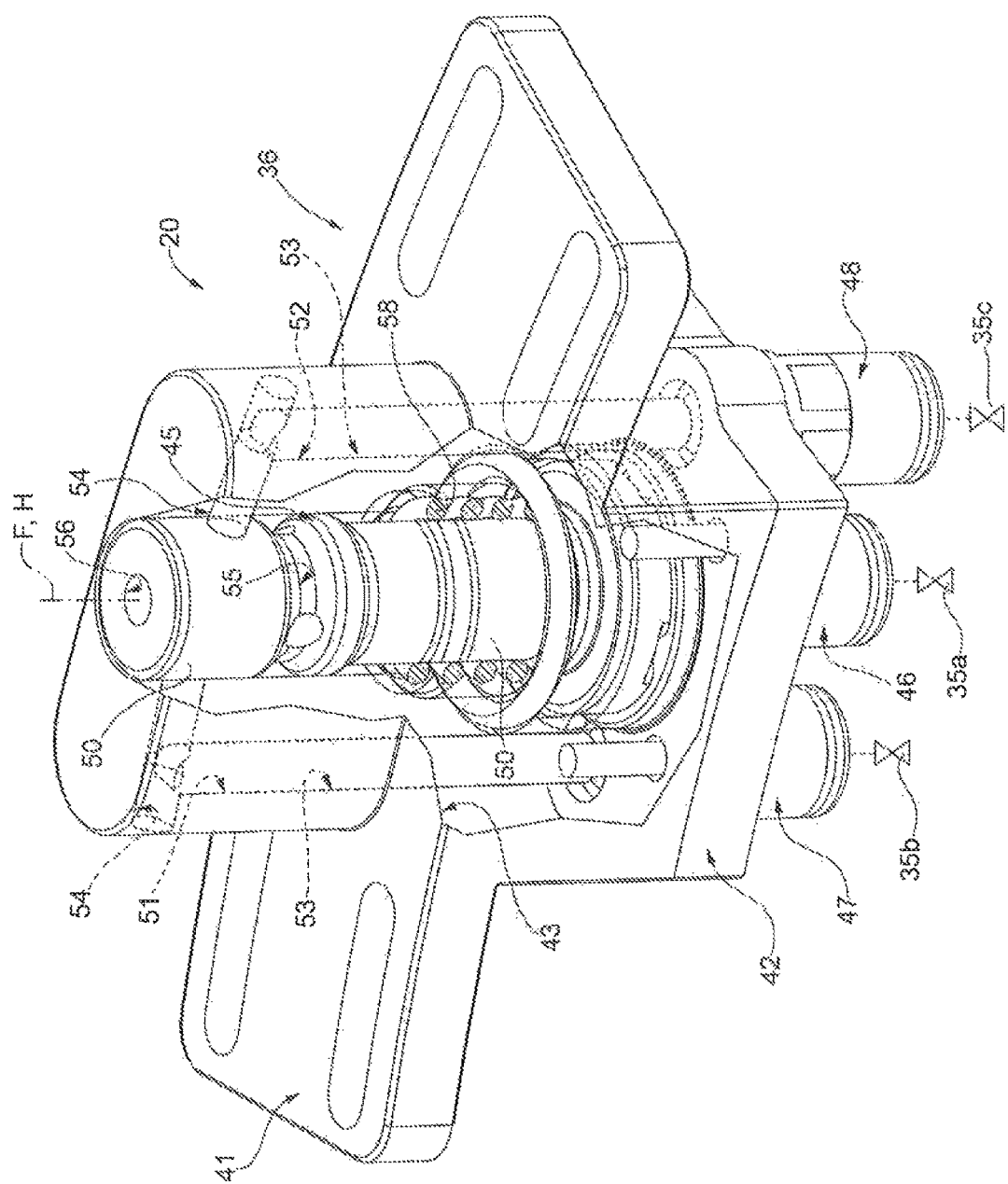
FIG. 9 is a further enlarged view of the diverting device of FIG. 8.

Housing 41 also comprises a pair of channels 51, 52, between which seat 43 is arranged (FIG. 9).

Each channel 51, 52 is fluidly connected, on one side thereof, to a respective duct 47, 48.

Each channel 51, 52 is fluidly connected with air ports 17 set at transfer station H, when shutter 45 is in the first position.

Each channel 51, 52 is fluidly isolated by air ports 17 set at transfer station H, when shutter 45 is in the second position.

More precisely, each channel 51, 52 also comprises:
- a portion 53 parallel to axis F and originating from a hole 49a, 49b (FIG. 8) of flange 42 connected to respective electro-valve 35b, 35c by means of respective ducts 47, 48; and
- a portion 54 orthogonal to axis F and opposite to respective hole 49a, 49b of flange 42.

When shutter 45 is in the first position, groove 55 faces portions 54 of channels 51, 52, thus establishing a fluidic connection between ducts 47, 48 and air ports 17 arranged at transfer station H, by means of superimposed channels 30a, 31.

In this way, when shutter 45 is in the first position (FIG. 10), air ports 17 travelling at transfer station H eject a jet of air on label 10a, 10b.

When shutter 45 is in the second position (FIG. 11), groove 55 is staggered from portion 54 along axis F, thus fluidly isolating ducts 47, 48 and air ports 17 travelling at transfer station H.

Accordingly, when shutter 45 is in the second position, no jet of air is ejected on label 10 travelling at transfer station H.

Transfer element 13 of each labelling group 4, 5 is also movable in a fully rest position, in which trajectory Q is spaced from application station B1, B2.

In greater detail, transfer station H is spaced from application station B1, B2 when transfer element 13 of labelling group 4, 5 is in the fully rest position.

When labelling group 4 (5) is in the first (second) operative configuration, respective diverting device 20 is set in the first (second) configuration and respective transfer element 13 is in the first (second) operative position.

When labelling group 4 (5) is in the first (second) rest configuration, respective diverting device 20 is set in the second configuration and respective transfer element 13 is in the fully rest position.

Transfer element 13 can also assume a plurality of partially rest positions (not shown in FIGS. 12 to 21), which are interposed between the operative position and the fully rest position.

Accordingly, labelling group 4 (5) can assume a plurality of first (second) partially rest configuration, which are interposed between the first (second) operative configuration and the first (second) rest configuration.

Preferably, diverting device 20 is set in the second configuration, when transfer element 13 is set in one of the partially rest positions.

In particular, transfer element 13 is movable between the fully rest position and the operative position along a rectilinear path parallel to a direction E.

Direction E is, in the embodiment shown, radial to path P and trajectory Q and lies on a plane orthogonal to axes A, C.

Each labelling group 4, 5 further comprises (FIGS. 3 to 7):
- a supporting structure 65 which supports shaft 6;
- a supporting structure 66 which supports transfer element 13; and
- connecting means 67 interposed between supporting structures 65, 66 and programmed to allow supporting structures 65, 66 to move with respect to each other parallel to direction E, so as to allow transfer element 13 to move between the fully rest position and the operative position.

In the embodiment shown, supporting structure 66 also supports cutting element 9 and glue roller 12.

Figure 6:
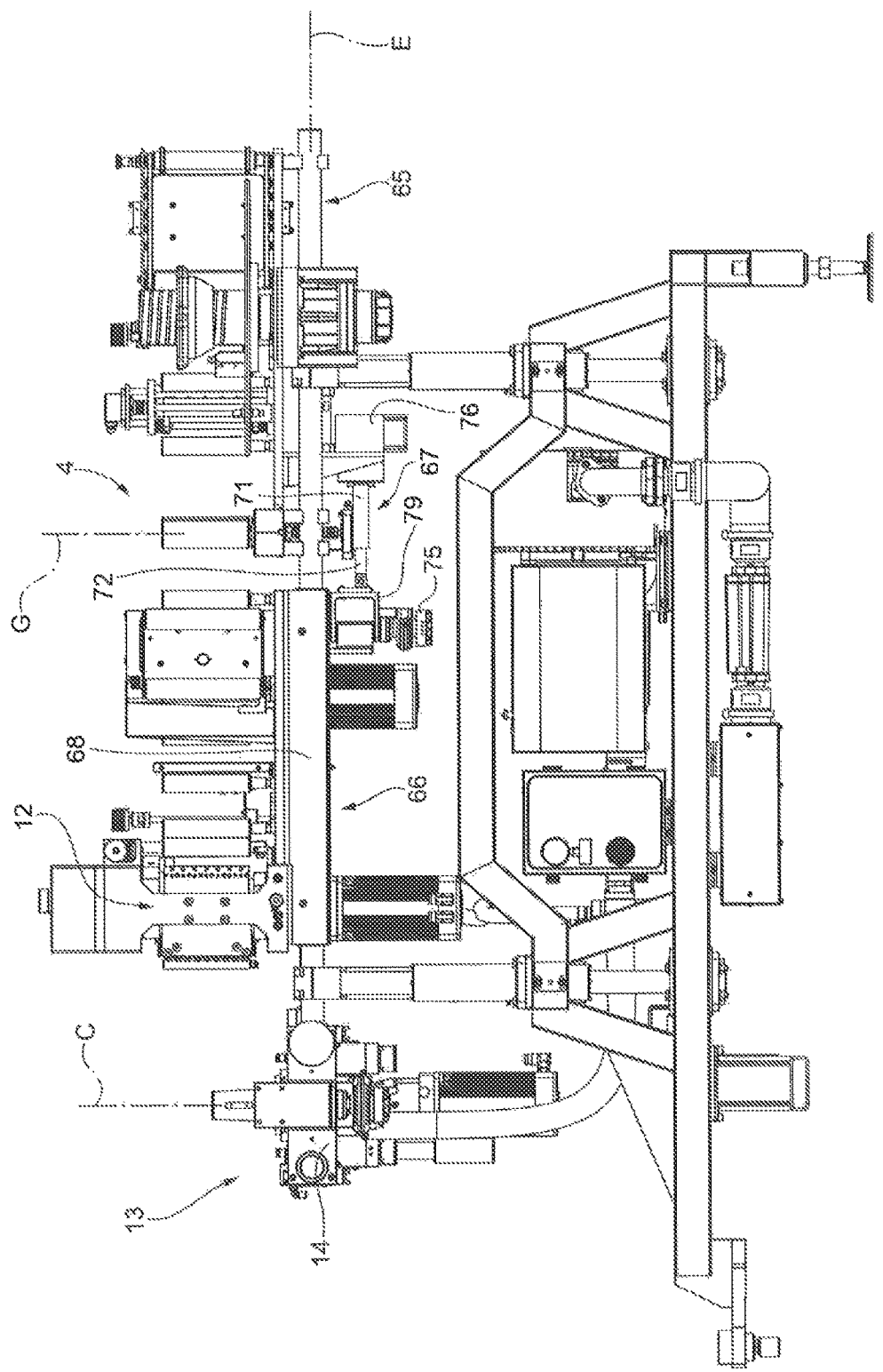
FIG. 6 is a frontal view of further components of the labelling group of FIGS. 2 to 5.
Figure 7:
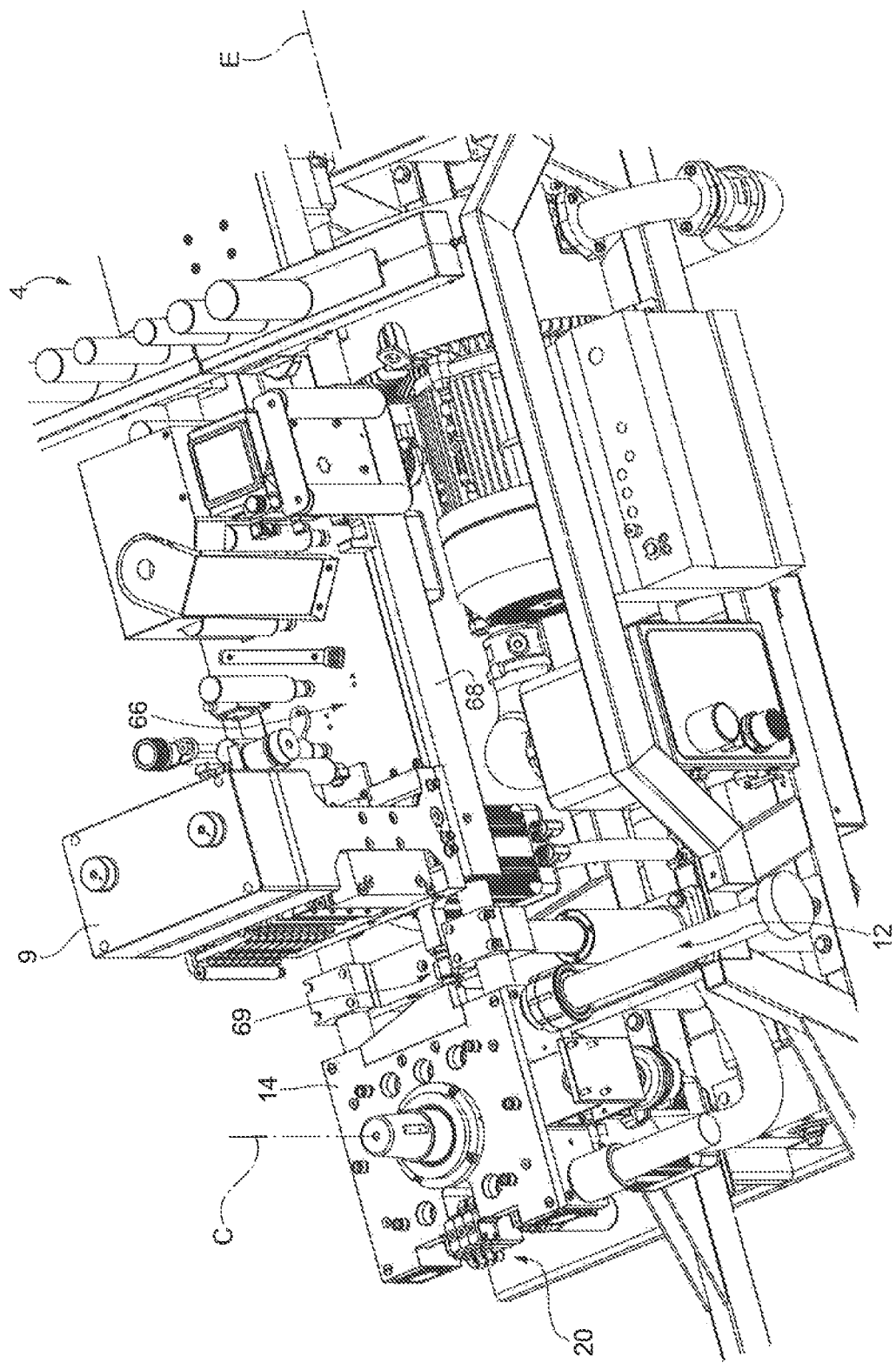
FIG. 7 is a perspective view of further components of the labelling group of FIGS. 2 to 6, with parts removed for clarity.
Figure 8:
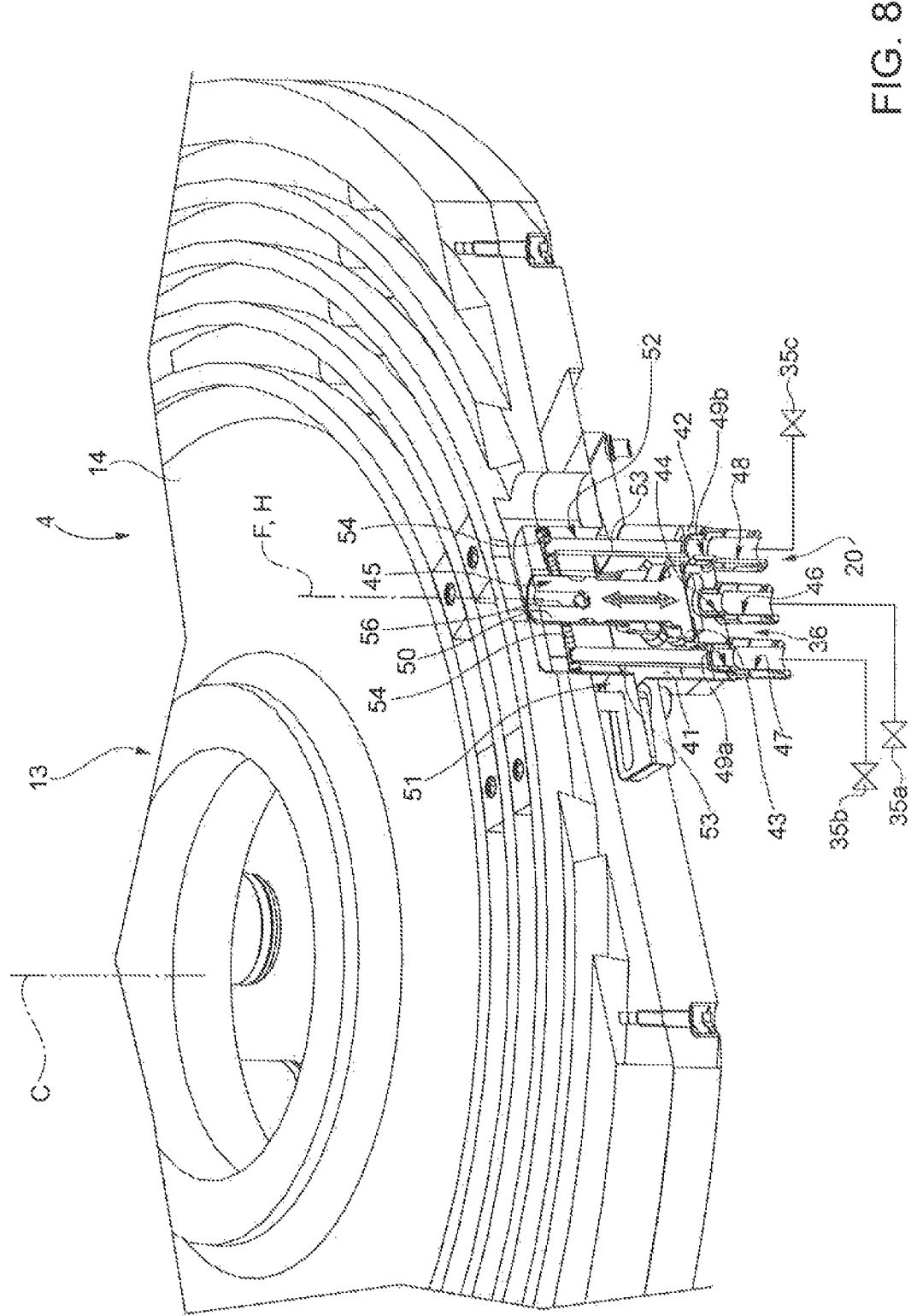
FIG. 8 is an enlarged perspective view of the labelling group of FIGS. 2 to 7 showing a diverting device, with parts removed for clarity.

With reference to FIGS. 6 and 7, supporting structure 66 comprises:
- a table 68 which supports a number of roller 16, cutting element 9 and glue roller 12; and
- a link 69, which are interposed between table 68 and stator 14.

Figure 3:
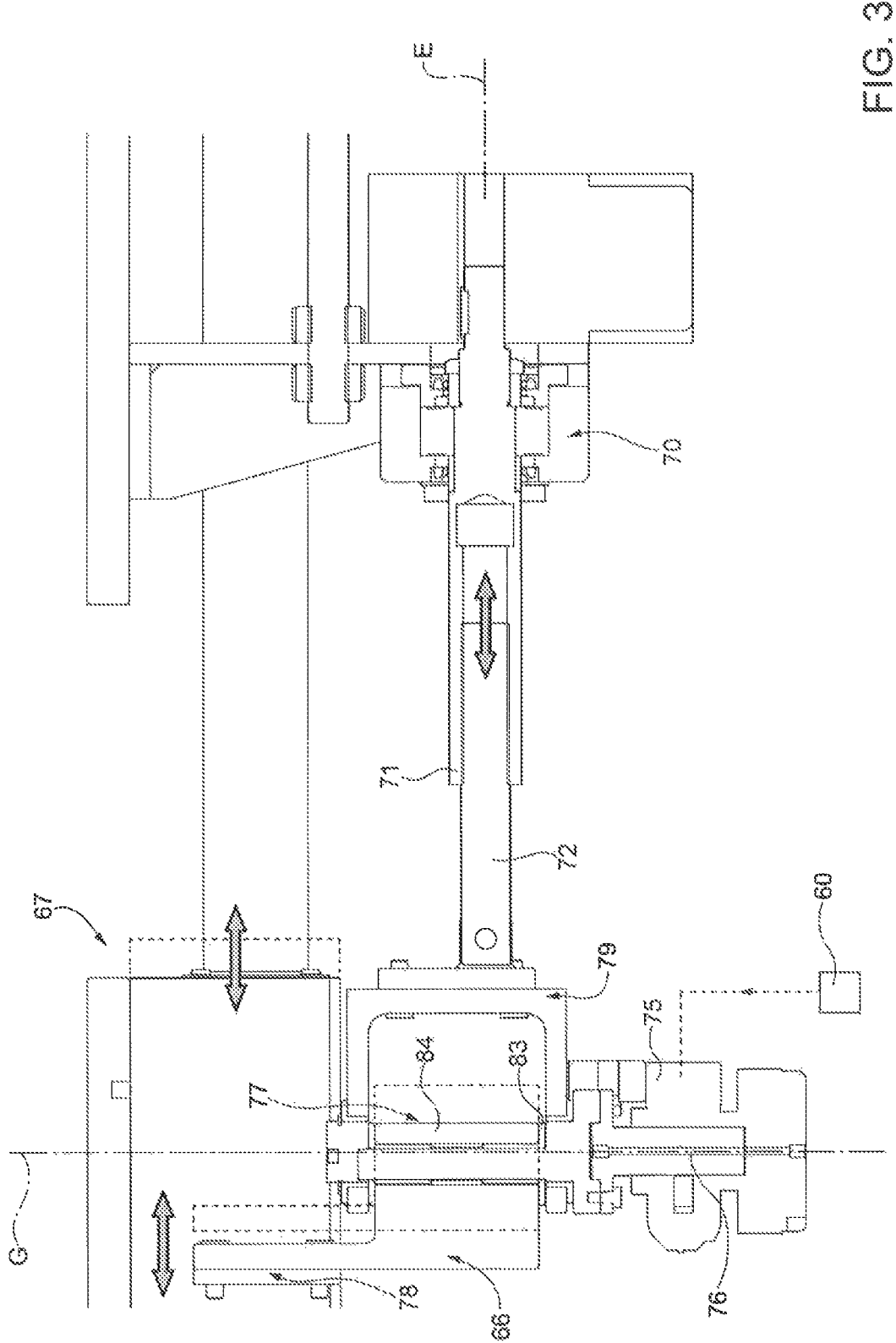
FIG. 3 is a section taken along line III-III of FIG. 2, with parts removed for clarity.
Figure 4:
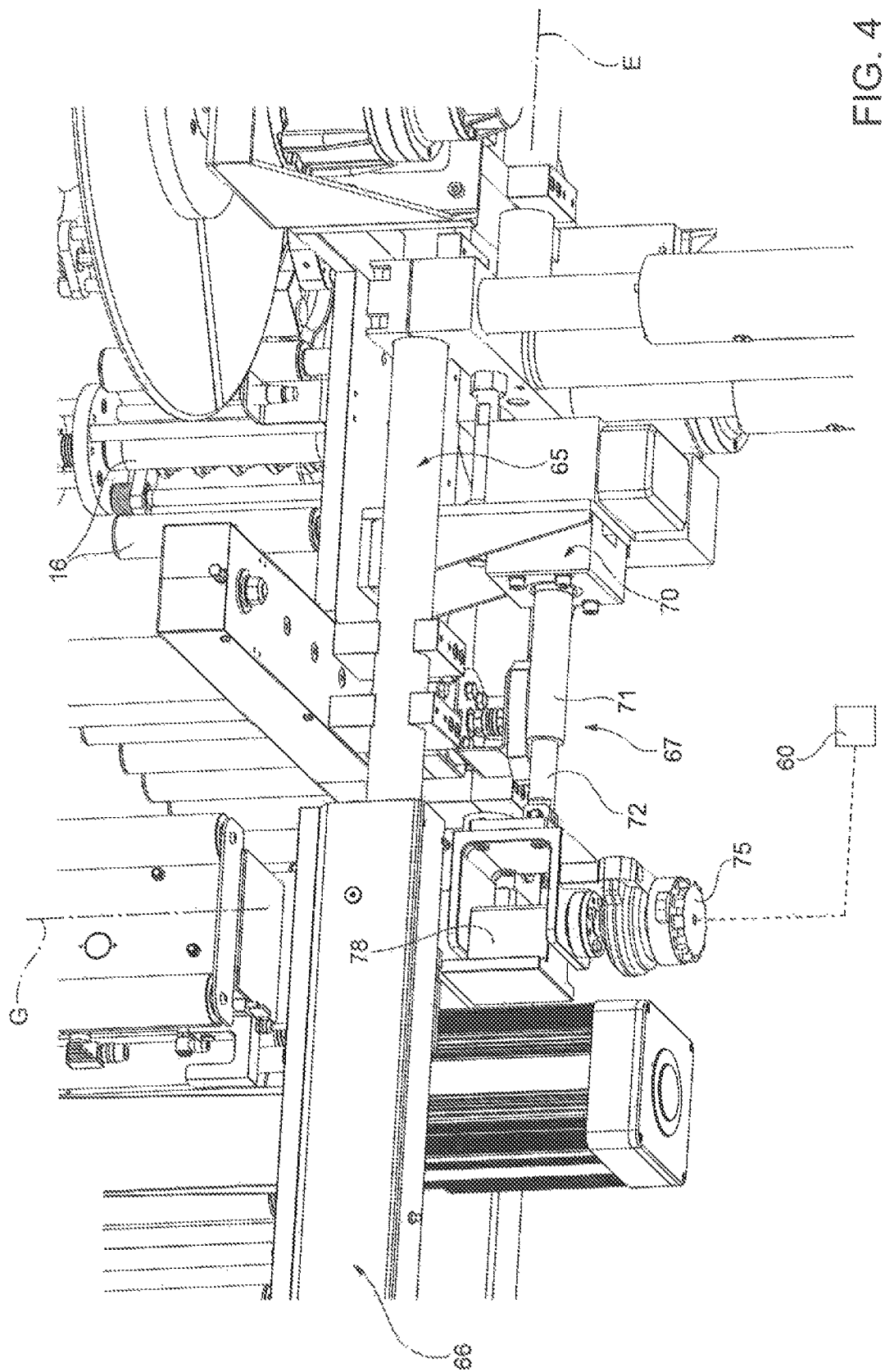
FIG. 4 is an enlarged perspective view of some components of the labelling group of FIGS. 2 and 3, with parts removed for clarity.
Figure 5:
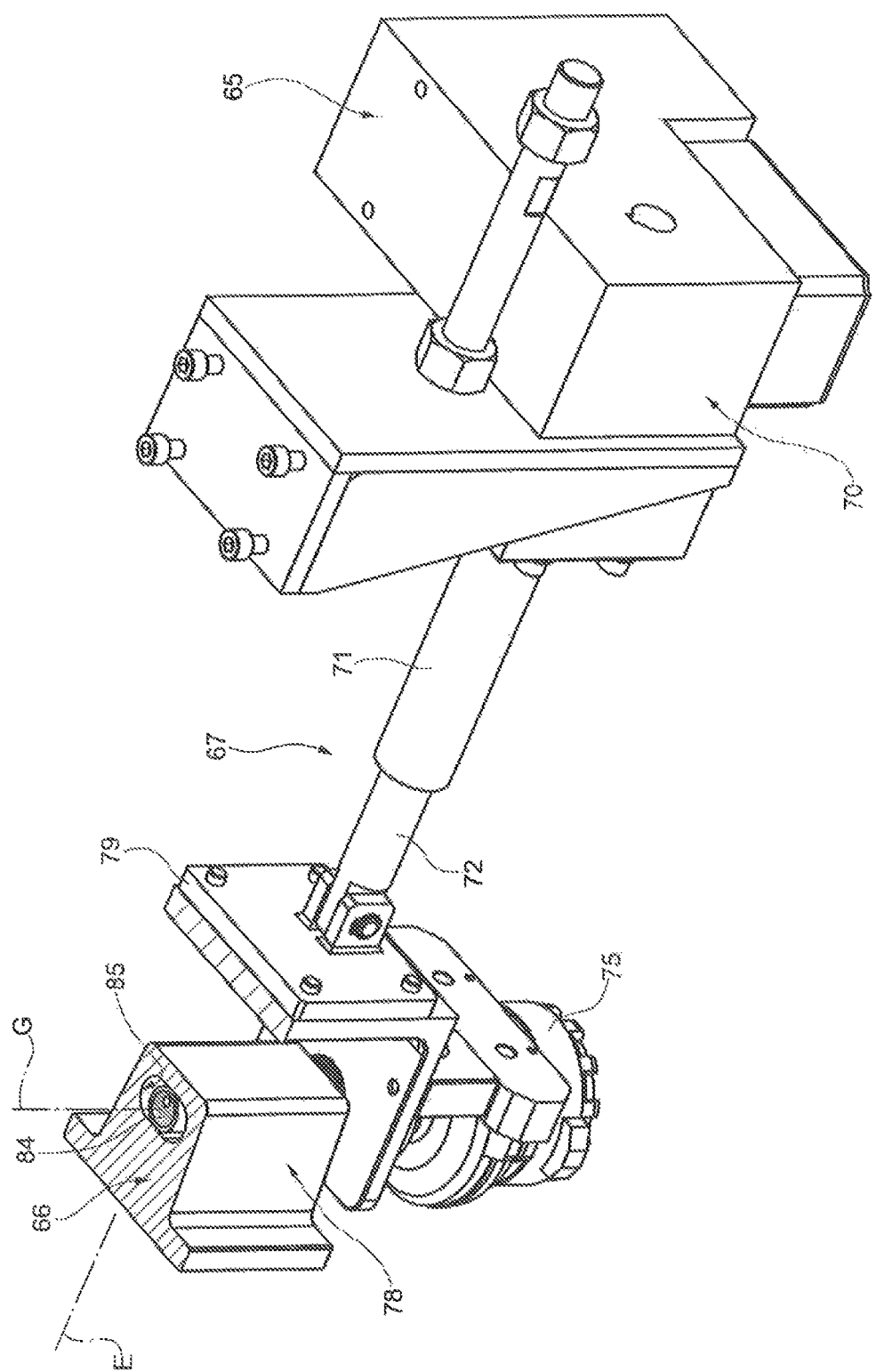
FIG. 5 is a further enlarged view of some components of the labelling group of FIGS. 2 to 4, with parts removed for clarity.

With reference to FIGS. 3 to 5, connecting means 67 comprise:
- a rotary actuator 70, which is supported by supporting structure 65;
- a shaft 71, which is driven in rotation by rotary actuator 70 about an its own axis parallel to direction E; and
- a rod 72, which is operatively connected to shaft 71.

Rod 72 and shaft 71 are operatively connected to each other, in such a way that the rotation of shaft 71 about an its own axis parallel to axis E causes the translation of rod 72 parallel to axis E.

In the embodiment shown, shaft 71 comprises, on the opposite side of rotary actuator 70, a portion with a female thread, which screws onto a male thread carried by a portion of rod 72. The male thread of rod 72 is, in particular, arranged on the side of rotary actuator 70.

Connecting means 67 further comprise:
- a motor 75 controlled by control unit 60, and connected to rod 72, by means of a C-shaped element 79;
- a shaft 76 which is driven in rotation by motor 75 about an axis G;
- an element 77 which rotates integrally with shaft 76 about axis G orthogonal to direction E; and
- a bracket 78, which is operatively connected to supporting structure 66, in particular to table 68.

Furthermore, bracket 78 and element 77 are coupled to each other, in such a way that the rotation of element 77 about axis G causes the sliding of bracket 78 parallel to direction E.

Still more precisely, element 77 comprises: a first portion 83 fitted to shaft 76 and a second portion 84 protruding from portion 83 parallel to and spaced from axis G.

Portion 83 is housed in a slot 85 (FIG. 5) defined by bracket 78. Slot 85 has a width parallel to direction E substantially corresponding to the width of portion 84, and a length in a direction orthogonal to direction E and axis G greater than the length of portion 84.

Accordingly, when element 77 rotates about axis G driven by motor 75, portion 84 eccentrically rotates about axis G inside slot 85, so causing the movement of bracket 78 and, therefore, of supporting structure 66 parallel to direction E.

Preferably, rotary actuator 70 is operated for arranging transfer element 13 in the operative position, on the basis of the format of articles 11, 11a, 11b while motor 75 is controlled by control unit 60 for displacing transfer element 13 between the operative position and the fully rest position.

The operation of labelling machine 1 and plant 100 is described in the following, starting from a condition (FIG. 12) in which labelling group 4 is in the first operative configuration while labelling group 5 is in the second rest configuration.

Conveyor 101 advances a plurality of pre-forms 108 which are blown in the blowing machine, so as to form respective articles 11, 11a, 11b. Articles 11, 11a, 11b are filled inside the filling machine and fed to carousel 3 of labelling machine 1.

Carousel 3 rotates about axis A and conveys a sequence of articles 11a, 11, 11b at substantially constant speed V0 along path P from input station I to application stations B2, B1 and from application station B1 to output station O.

Diverting device 20 of labelling group 4 is in the first configuration and transfer station H of labelling group 4 coincides with application station B1.

Accordingly, transfer element 13 of labelling group 4 transfers, one after the other, labels 10a from reel 7a onto articles 11a travelling at application station B1.

In that condition, control unit 60 keeps the rotational speed of drum 15—and, therefore, of strip 8—of labelling group 4 at highest first speed value V1.

On the contrary, diverting device 20 of labelling group 5 is in the second configuration and transfer station H of labelling group 5 is spaced along direction E from by application station B2.

Accordingly, transfer element 13 of labelling group 5 is idle, is prevented from transferring labels 10b onto articles 11b travelling at application station B2, and conveys labels 10b to sucking device 21 at discarding station D.

In other words, labelling group 4 acts as the "master" labelling group while labelling group 5 acts as the "slave" labelling group.

In case sensor 80 generates a signal associated to the fact that reel 7a is terminating, gap creating element 110 interrupts the flow of pre-forms 108 along conveyor 101.

After a given amount of time, switch 111 of element 110 allows again the flow of pre-forms 108 along conveyor 101.

Thus, gap 109 and, therefore, gap 82 is generated and is bounded by immediately adjacent downstream article 11a and immediately adjacent upstream article 11b.

Control unit 60, as a consequences of the signal generated by sensor 80:
- decelerates transfer element 13 of labelling group 4 acting as "master labelling group", starting from speed V1; and
- accelerates transfer element 13 of labelling group 4 acting as "master labelling group", up to speed V1.

Furthermore, control unit 60, as a consequence of that signal generated by sensor 80:
- moves diverting device 20 of labelling group 4 in the second configuration (FIGS. 13 to 15);
- moves supporting structure 66 and, therefore, transfer element 13 of labelling group 4 along direction E, so as to move labelling group 4 from the first operative configuration to the first rest configuration (FIGS. 13 to 15); and
- moves supporting structure 66 and, therefore, transfer element 13 of labelling group 5 along direction E, so as to move labelling group 5 from the second rest configuration to the second operative configuration (FIGS. 13 to 15).

When labelling group 5 has reached the second operative configuration, control unit 60 moves diverting device 20 of labelling group 5 in the first configuration (FIG. 14), so that transfer element 13 can release labels 10b onto articles 11b travelling at application station B2.

In this way, labelling group 4 now acts as the "slave" labelling group while labelling group 5 now acts as the "master" labelling group.

Control unit 60 is programmed for moving labelling group 4 from the first operative configuration to the first rest configuration, after relative drum 15 has transferred label 10a onto downstream immediately adjacent article 11a at application station B1.

Control unit 60 is also programmed for moving labelling group 5 to the second operative configuration, before upstream immediately adjacent article 11b has reached application station B2.

In other words, gap 82 moves along path between application stations B1, B2, after labelling group 4 has been moved away from the first operative configuration and before labelling group 5 has been set in the second operative configuration.

Figure 16:
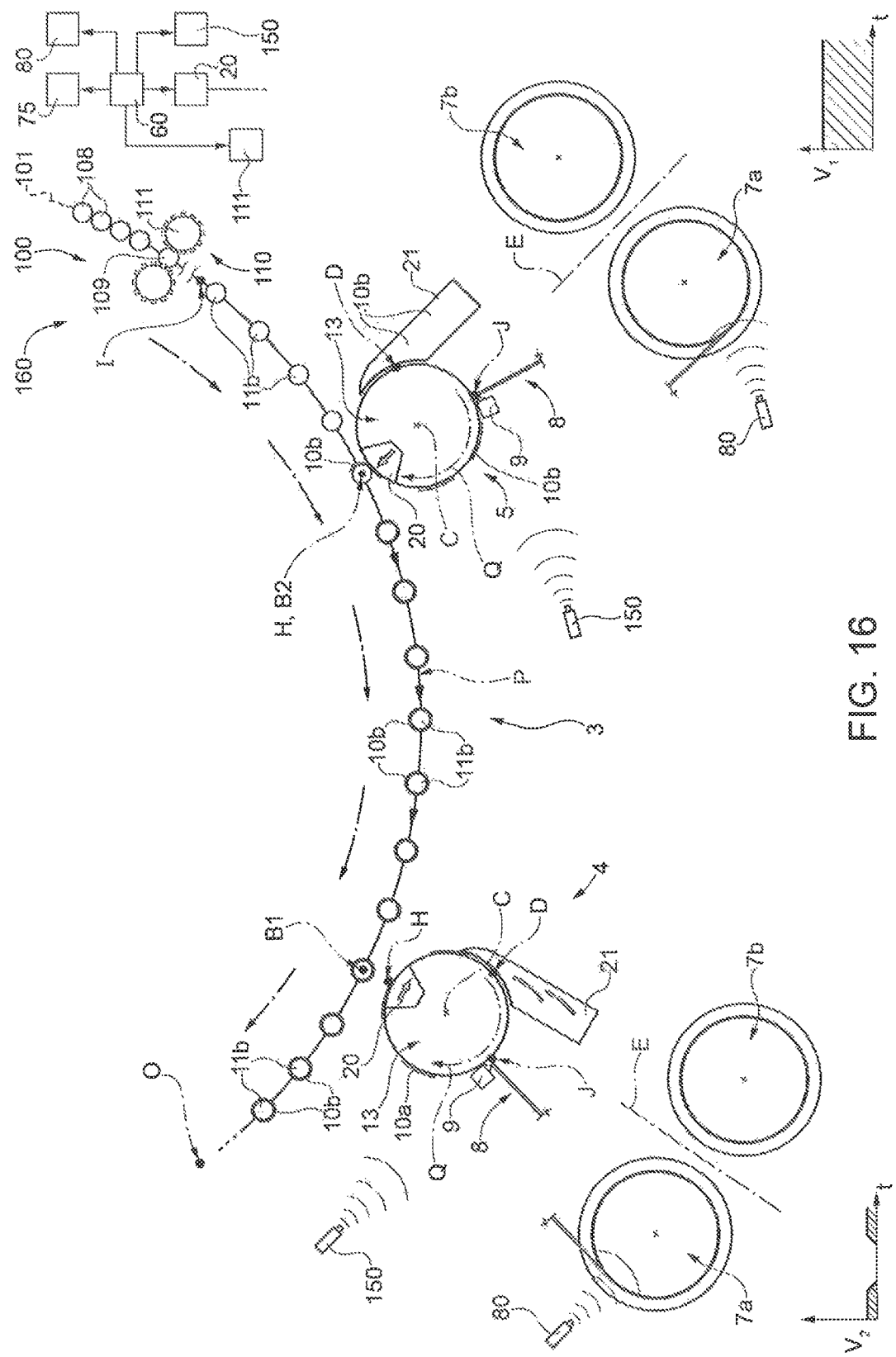
Figure 17:
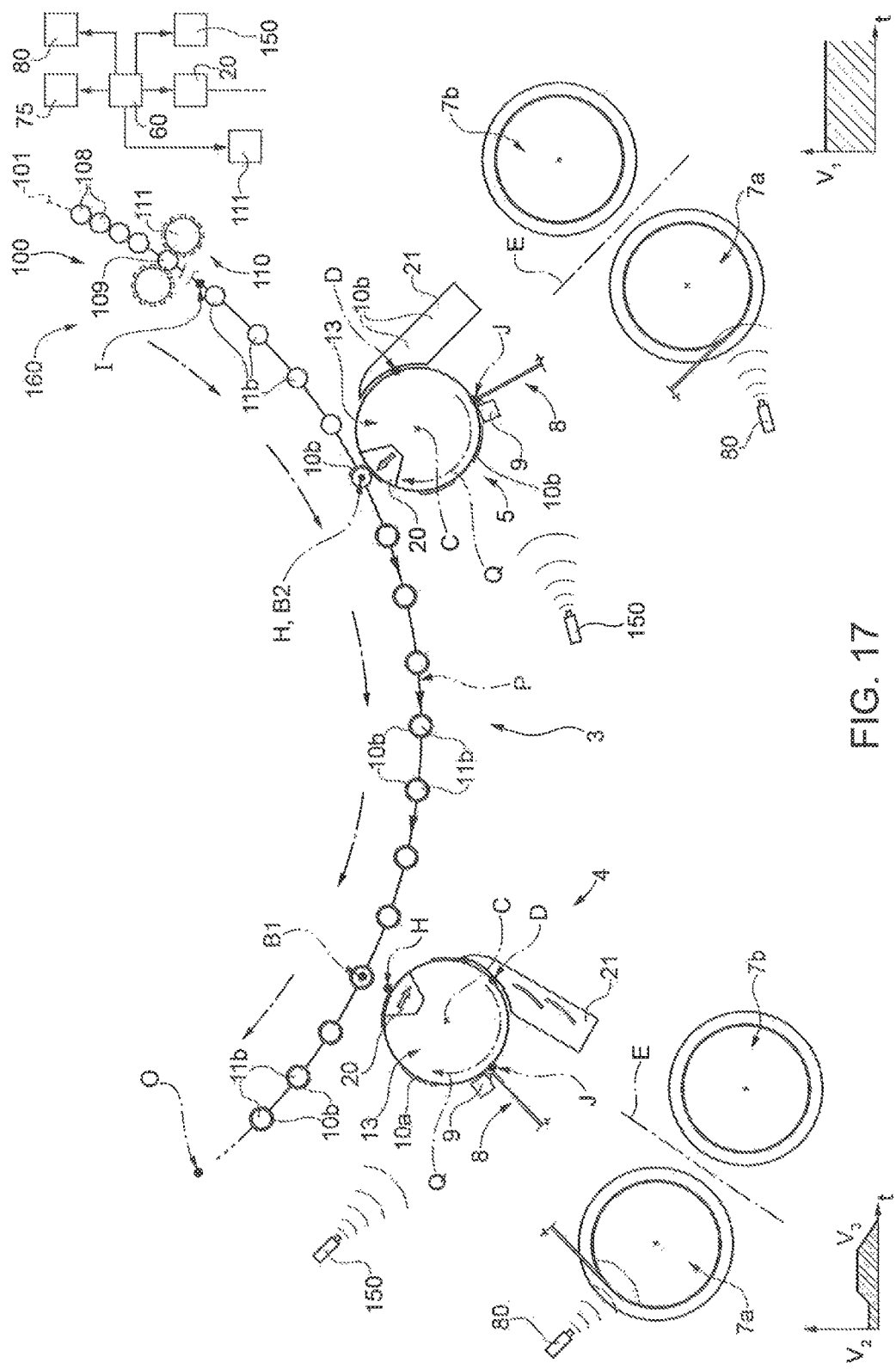
Figure 18:
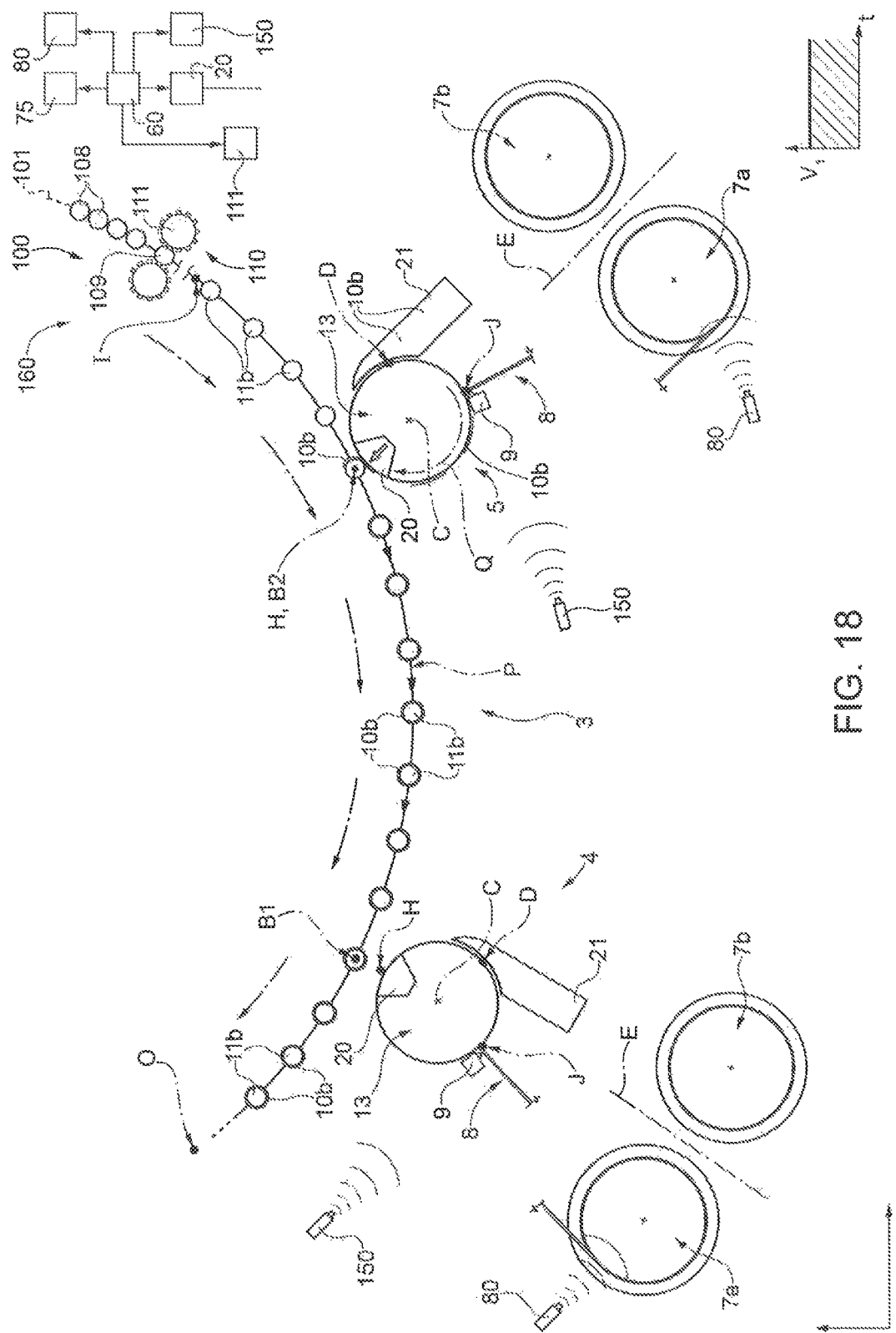

In this way, no articles 11, 11a, 11b remains unlabelled. Still more precisely, control unit 60:

decelerates, along a linear descending ramp in the embodiment shown, the speed of transfer element 13 (and therefore of strip 8) of labelling group 4 up to the second speed V2 reached when the latter is in the first rest configuration (FIG. 15);

keeps transfer element 13 (and therefore strip 8) of labelling group 4 at substantially null speed, when reel 7b is joined to reel 7a (FIG. 16);

accelerates transfer element 13 (and therefore strip 8) at second speed V2 and then slows down transfer element 13 at null speed (FIG. 16);

accelerates transfer element 13 (and therefore of strip 8) at third speed V3, according to a linear ascending ramp (FIG. 17); and decelerates transfer element 13 at null speed V3, according to a linear descending ramp (FIG. 17).

In particular, when transfer element 13 moves at speed V2, visual control system 150 checks the correct positioning of labels 10a at discarding station D, thus checking out the correct joining of new reel 7b to reel 7a.

Furthermore, control unit 60 accelerates, according a liner ascending ramp in the embodiment shown in FIG. 13, the speed of transfer element 13 (and therefore of strip 8) of labelling group 5 up to speed V1.

With particular reference to FIG. 13, speed V1 is reached by transfer element 13 (and, therefore, of strip 8) of labelling group 5, before the latter reaches the second operative configuration shown in FIG. 15.

The operation of labelling machine 1 and plant 100 is now described with reference to FIG. 19 to 21 and starting from the condition shown in which labelling group 4 is in the first operative configuration and labelling group 5 is in the second rest configuration.

In case sensor 85 detects that labelling group 4 is not properly applying labels 10a onto respective articles 11a at application station B1, expelling device 115 is operated to expel, for a certain amount of time, articles 11 from path P upstream of application station B2, with reference to the advancing direction of articles 11, 11a, 11b along path P (FIG. 19).

In this way, gap 82 is generated.

Furthermore, control unit 60, in response to the signal generated by sensor 85:

moves diverting device 20 of labelling group 4 in the second configuration (FIG. 19)

moves supporting structure 66 and, therefore, transfer element 13 of labelling group 4 along direction E, so as to move labelling group 4 from the first operative configuration to the first rest configuration (FIG. 19); and moves supporting structure 66 and, therefore, transfer element 13 of labelling group 5 along direction E, so as to move labelling group 5 from the rest configuration to the operative configuration (FIG. 20).

When labelling group 5 has reached the second operative configuration, control unit 60 moves diverting device 21 of labelling group 5 in the first configuration (FIG. 21), so that transfer element 13 can release labels 10b onto articles 11b travelling at application station B2.

In this way, labelling group 4 now acts as the "slave" labelling group while labelling group 5 now acts as the "master" labelling group (FIG. 21).

Still more precisely, control unit 60 slows down up to a null value the speed of transfer element 13—and therefore of strip 8—of labelling group 4, according to a liner descending ramp in the embodiment shown in FIG. 20.

Control unit 60 further accelerates the speed of transfer element 13—and, therefore, of strip 8, of labelling group 5, according to a liner ascending ramp in the embodiment shown in FIG. 19.

In the meanwhile, not properly labelled articles 11b are discarded at expelling device 120, which is arranged downstream of application station B1, with reference to the advancing direction of articles 11, 11a, 11b along path P.

From an analysis of the features of machine 1 and the method made according to the present invention, the advantages it allows to obtain are apparent.

In particular, gap creating element 110 creates gap 82 inside succession of articles 11a, 11b travelling along path at speed V1, while one (4) of labelling group 4 (5) acts as "master" labelling group and applies labels 10a on article 11a and the other one (5) of labelling group acts as "slave" labelling group.

In this way, it is possible matching carousel 3 operating at constant speed V0 with labelling groups 4 (5) which require respective transfer elements 13 (and, therefore, respective drums 15 and strips 8) be accelerated at speed V1.

As a matter of fact, in case labelling group (5) acts as a "master" labelling group, it is enough:

activating gap creating element 110, so as to create gap 82; and accelerating transfer element 13 (and, therefore, respective drums 15 and strips 8) of the other labelling group 5 (4) up to speed V1, while the other labelling group 5 (4) moves from the second (first) rest configuration to the second (first) operative configuration.

Moreover, the creation of gap 82 further allows to connect carousel 3 to the remaining parts of conveying line 160, without requiring the introduction of buffers to decouple the speed of carousel 3 and the speed of the remaining parts of conveying line 160.

Furthermore, thanks to the fact that, as it is displaced from the first (second) rest configuration to the first (second) operative configuration, labelling group 4 (5) moves along direction E, it is possible to accelerate transfer element 13 thereof at very high speed V1, thus allowing also conveyor 3 to be advanced at very high speed V0.

Furthermore, in case the operation of one labelling group 4 (5) applying labels 10a (10b) onto articles 11a (11b) and acting as the "master" labelling group needs to be interrupted, it is no longer necessary interrupting the operation of whole labelling machine 1 and of upstream machines of plant 100.

As a matter of fact, it is enough activating gap creating element 110 and moving the other labelling group 5 (4) acting as the "slave" labelling group from the second (first) rest configuration into the second (first) operative configuration.

In this way, the other labelling group 5 (4) can apply labels 10b (10a) onto articles 11b (11a).

Furthermore, control unit 60 is programmed for moving labelling group 4 from the first operative configuration to the first rest configuration after transfer element 13 of labelling group 4 has transferred label 10a onto immediately adjacent downstream article 11a at application station B1, while control unit 60 is programmed for moving labelling group 5 from second rest configuration to second operative position before transfer element 13 of labelling group transfer labels 10b onto immediately adjacent upstream article 11b at application station B2.

In this way, no articles 11a, 11b remains unlabelled.

In case reel 7a must be replaced (FIGS. 16 and 17), control unit 60 moves respective labelling group 4 (5) into the first (second) rest configuration and preferably arrests transfer element 13 and strip 8 of labelling group 4 (5).

Accordingly, new reel 7b can be joined to a substantially stationary reel 7a, regardless of the throughput of labelling machine 1.

In this way, when the joining of new reel 7b to reel 7a is carried out by non skilled technical staff or with automatic systems, there is substantially no risk to misalign new reel 7b with reel 7a and, therefore, there is substantially no risk of misaligning labels 10a, 10b.

Furthermore, when the labelling group 4 (5) is in the first (second) rest configuration and after new reel 7b has been joined to reel 7a, it is possible to control the position of cut labels 10a (10b) on drum 15 at discarding station D, by using visual control system 150.

In case sensor 85 detects that labelling group 4 (5) acting as the "master" labelling group is not properly applying labels 10a (10b) onto articles 11a (11b), control unit 60 moves labelling group 4 into the first (second) rest configuration and labelling group 5 (4) into the second (first) operative configuration (FIGS. 19 to 21).

In this way, it is possible to repair the labelling group 4 (5) set in the first (second) rest configuration, without interrupting the operation of labelling machine 1.

It is important to mention that all the above advantages apply substantially unchanged to operative groups of plant 100 others than labelling groups 4, 5 and to machines of plant 100 other than labelling machine 1

Finally, it is apparent that modifications and variants not departing from the scope of protection of the claims may be made to machine 1 and to the method.

In particular, labelling group 4, 5 could comprise, instead of diverting device 20, a different device which can selectively deviate strip 8 from path Q upstream of cutting device 9.

In other words, that different device prevents strips 8 from reaching cutting device 9 and, therefore, drum 15.

Control unit 60 could be programmed for moving strip 8 and drum 15 of transfer element 13 of labelling groups 4, 5, according to different motion laws, when it moves transfer element 13 between the operative position and the fully rest position.

Furthermore, labelling machine 1 could comprise different kind of sensor for detecting that the operation of labelling group 4, 5 in the first (second) operative configuration needs to be interrupted.

Switch 111 could be used for interrupting the flow of pre-forms 108, in case sensor 85 detects that labelling group 4, 5 in the first (second) operative configuration is not properly transferring labels 10a, 10b to articles 11a, 11b.

Finally, expulsing device 115 could be used for expelling articles 11 upstream of application stations B1, B2 in case that reel 7a of labelling group 4, 5 in the first (second) operative configuration needs to be replaced.

The invention claimed is:

1. A labelling machine for applying at least one first label onto a first article and at least one second label onto a second article, comprising:
    a carousel rotatable about a vertical axis and configured to advance a succession of spaced-apart articles including the first article and the second article along an arc-shaped path at a first tangential speed;
    an input station configured to feed the articles to be labelled to the carousel;
    an output station configured to receive labelled articles exiting the carousel, wherein the path extends between the input station and the output station;
    a first labelling assembly located at a first application station and having a first transfer mechanism, the first transfer mechanism being configured to apply the first label onto the first article and operable at a second tangential speed, the first labelling assembly being configured to feed labels to the first transfer mechanism, and the first labelling assembly being movable between:
        an operative position, in which the first transfer mechanism transfers labels onto the articles advanced along the path, and
        an inoperative position, in which the first transfer mechanism is separated from the first application station and prevented from transferring labels onto the articles;
    a gap-creating mechanism configured to create a predetermined gap in the succession of spaced articles advancing along the path, the gap being a distance bounded by an adjacent downstream article and an adjacent upstream article;
    a second labelling assembly located at a second application station and having a second transfer mechanism, the second transfer mechanism being configured to apply the second label onto the second article at the second tangential speed, the second labelling assembly being configured to feed labels to the second transfer mechanism, and the second labelling assembly being movable between:
        an operative position, in which the second transfer mechanism transfers labels onto the articles advanced along the path, and
        an inoperative position, in which the second transfer mechanism is separated from the second application station and prevented from transferring labels onto the articles; and
    a control unit programmed to:
        decelerate the first labelling assembly from the second tangential speed and move the first labelling assembly from the operative position to the inoperative position after labelling the downstream article; and
        accelerate the second labelling assembly up to the second tangential speed and move the second labelling assembly from the inoperative position to the operative position for labelling the upstream article and successive articles to be labelled, wherein the control unit decelerates the first labelling assembly from the second tangential speed and accelerates the second labelling assembly up to the second tangential speed when the gap-creating mechanism creates the predetermined gap between the at least one first article and the at least one second article.

2. The machine of claim 1, wherein
the control unit is programmed to perform at least one of the following:
decelerate the first transfer mechanism from the second tangential speed, after the first labelling assembly has carried out the labelling operation onto the downstream article; or
accelerate the second transfer mechanism up to the second tangential speed, before the second labelling assembly has carried out the labelling operation onto the upstream article.

3. The machine of claim 1, wherein at least one of the first labelling assembly and the second labelling assembly is movable along a direction transversal to the path towards and away from the first application station and second application station, respectively.

4. The machine of claim 1, wherein at least one:
the first tangential speed is substantially constant; or
the second tangential speed substantially equals the first tangential speed.

5. The machine of claim 1, further comprising a sensor configured to generate a signal associated with the operation of the first or second labelling assemblies being interrupted;
the gap creating mechanism being controllable to create the gap in response to the signal.

6. The machine of claim 1, wherein the gap creating mechanism includes an expelling device for expelling at least one article upstream of the first labelling assembly and the second labelling assembly, proceeding according to an advancing direction of the articles.

7. A plant for producing the first article and the second article, comprising:
a second carousel configured to advance a succession of a first pre-form and a second pre-form;
a blowing unit for blowing the first pre-form and the second pre-form, so as to form the first article and the second article;
a machine according to claim 1, wherein the carousel is a first carousel and the gap is a first gap; and
the gap creating mechanism being configured to create a second gap inside the succession of the first pre-form and the second pre-form.

8. The machine of claim 1, wherein the first transfer mechanism and the second transfer mechanism each comprise:
a drum rotatable about an axis for transferring labels from the first or second labelling group onto the articles advanced along the path; and
a diverting device movable between a first configuration, in which the diverting device enables the drum to transfer labels onto the articles to be labelled, and a second configuration, in which the diverting device prevents the drum from transferring labels onto the articles to be labelled.

9. The machine of claim 8, further comprising a label discarding station, the drum being configured to transfer labels from the first or second labelling assembly to the label discarding station when the diverting device is located in the second configuration.

10. The machine of claim 9, wherein the label discarding station comprises a device for removing discarded labels from the drum.

11. The machine of claim 1, wherein the control unit is programmed to:
move the first labelling assembly from the operative position to the inoperative position after transfer of a label from the first application station to the downstream article; and
move the second labelling assembly from the inoperative position to the operative position before the upstream article reaches the second application station, whereby none of the succession of spaced articles remains unlabeled.

12. The machine of claim 8, further comprising a label discarding station, wherein the control unit is programmed to:
move the first labelling assembly from the operative position to the inoperative position after transfer of a label from the first application station to the downstream article; and
move the second labelling assembly from the inoperative position to the operative position before the upstream article reaches the second application station, whereby none of the succession of spaced articles remains unlabeled.

13. The machine of claim 12, wherein the drum transfers at least the first and second labels from the first or second labelling assembly to the label discarding station when the diverting device is located in the second configuration, and wherein the discarding station comprises a suction device.

* * * * *